United States Patent
Toyoda et al.

(10) Patent No.: US 10,841,453 B2
(45) Date of Patent: Nov. 17, 2020

(54) IMAGE FILE CREATION APPARATUS, IMAGE FILE CREATION METHOD, RECORDING MEDIUM STORING IMAGE FILE CREATION PROGRAM, AND CONTENT CREATION SYSTEM

(71) Applicant: Olympus Corporation, Hachioji (JP)

(72) Inventors: Tetsuya Toyoda, Hachioji (JP); Masaru Ikeda, Fujimi (JP); Hideaki Yoshida, Hachioji (JP); Kazuhiko Osa, Hachioji (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 50 days.

(21) Appl. No.: 16/292,123

(22) Filed: Mar. 4, 2019

(65) Prior Publication Data
US 2019/0281183 A1    Sep. 12, 2019

(30) Foreign Application Priority Data
Mar. 9, 2018   (JP) ................. 2018-043314

(51) Int. Cl.
*H04N 1/32* (2006.01)
*H04N 1/00* (2006.01)
*H04N 7/18* (2006.01)

(52) U.S. Cl.
CPC ..... *H04N 1/32128* (2013.01); *H04N 1/00114* (2013.01); *H04N 1/00347* (2013.01); *H04N 7/181* (2013.01); *H04N 2201/0084* (2013.01)

(58) Field of Classification Search
None
See application file for complete search history.

(56) References Cited

U.S. PATENT DOCUMENTS

| | | | |
|---|---|---|---|
| 10,078,644 B1 * | 9/2018 | Newman | G06F 16/78 |
| 2005/0134707 A1 * | 6/2005 | Perotti | H04N 5/232 348/239 |
| 2014/0152854 A1 * | 6/2014 | Iwaki | H04N 1/00198 348/207.1 |
| 2016/0065908 A1 * | 3/2016 | Chang | G06F 21/79 348/158 |
| 2017/0324888 A1 * | 11/2017 | Boone | H04N 5/23206 |
| 2019/0356885 A1 * | 11/2019 | Ribeiro | G06T 7/70 |

FOREIGN PATENT DOCUMENTS

JP    2008-054155 A    3/2008

* cited by examiner

*Primary Examiner* — James M Hannett
(74) *Attorney, Agent, or Firm* — John C. Pokotylo; Pokotylo Patent Services

(57) ABSTRACT

An image file creation apparatus includes an acquisition circuit configured to acquire a picked-up image, and a processor configured to create an image file in recording the acquired image, in which the processor includes cooperation participation information for clarifying a relationship between the picked-up image and a cooperation image cooperating with the picked-up image as metadata in the image file, and the cooperation participation information includes at least one of (a) request information for requesting to provide the cooperation image cooperating with the picked-up image, and (b) provision information indicating whether or not the picked-up image can be provided as the cooperation image.

11 Claims, 22 Drawing Sheets

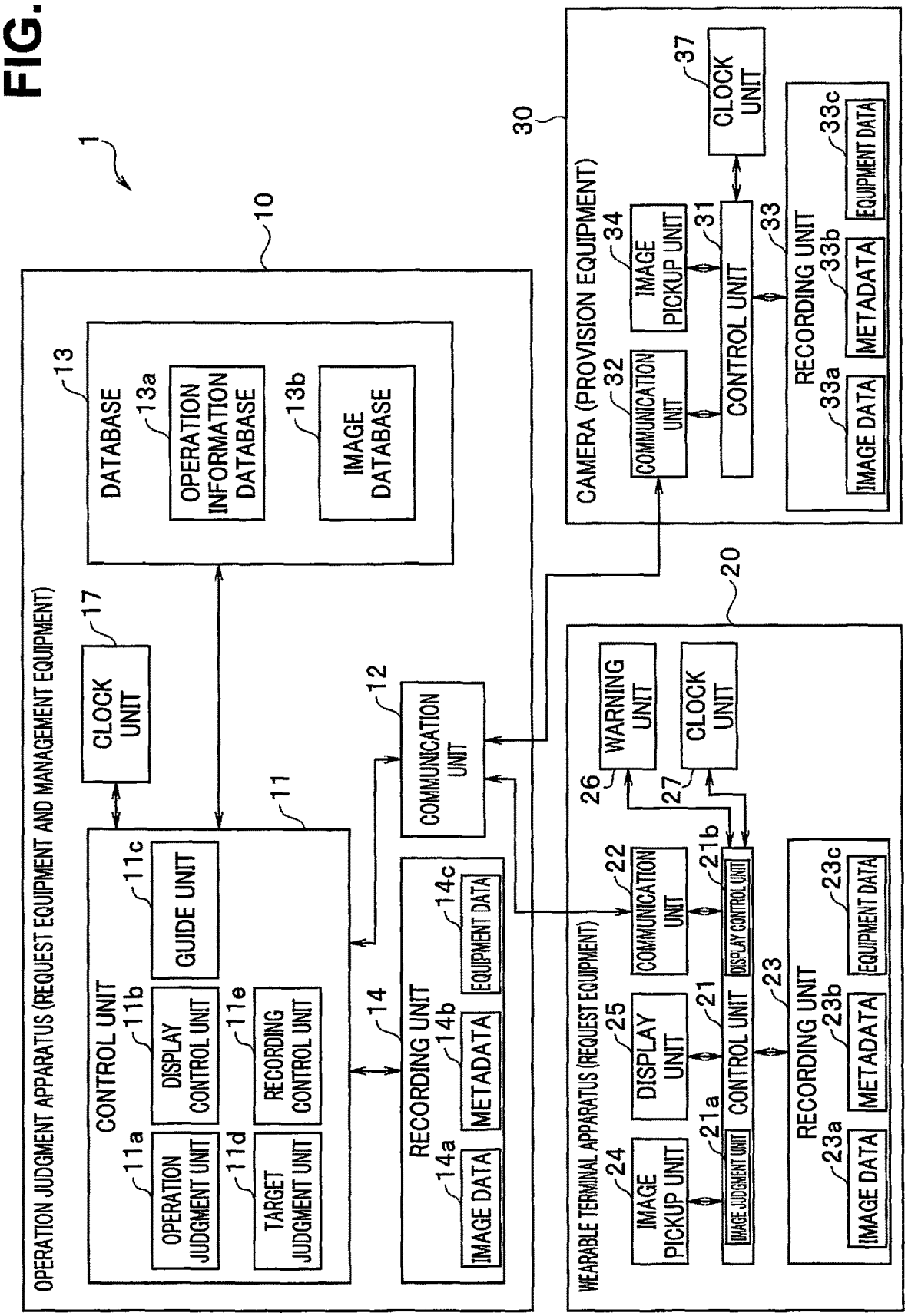

FIG. 7

| METADATA OF CAMERA 30 | |
|---|---|
| TRIGGER OUTPUT EQUIPMENT | B |
| TRIGGER JUDGMENT EQUIPMENT | A |
| SHOOTING REQUEST EQUIPMENT | A |
| REQUEST DESTINATION EQUIPMENT | A |
| ASSOCIATED RESPONSE EQUIPMENT | |
| REQUEST CONDITION | $\Delta T1$ |
| RESPONSE IMAGE FILE NAME | |

FIG. 8

| METADATA OF CAMERA 30 | |
|---|---|
| TRIGGER OUTPUT EQUIPMENT | B |
| TRIGGER JUDGMENT EQUIPMENT | A |
| SHOOTING REQUEST EQUIPMENT | A |
| REQUEST DESTINATION EQUIPMENT | A |
| ASSOCIATED RESPONSE EQUIPMENT | B |
| REQUEST CONDITION | $-\Delta T2$ |
| RESPONSE IMAGE FILE NAME | Gb2 |

FIG. 14

| | |
|---|---|
| THE EQUIPMENT IS IMAGE PICKUP SUBJECT | |
| EQUIPMENT OTHER THAN THE EQUIPMENT IS SUBJECT | |
| NUMBER OF PIECES OF EQUIPMENT OTHER THAN THE EQUIPMENT IS PLURAL | |
| CONTROL EQUIPMENT CONTROLLING ALL PIECES OF EQUIPMENT EXISTS | |

FIG. 15

| | |
|---|---|
| ○ | INDEPENDENT |
| ○←→○ | EQUAL COOPERATION |
| ○←→△ | MASTER-SLAVE COOPERATION 1 |
| △←→○ | MASTER-SLAVE COOPERATION 2 |

FIG. 23

| METADATA | |
|---|---|
| TRIGGER OUTPUT EQUIPMENT | B |
| TRIGGER JUDGMENT EQUIPMENT | B |
| SHOOTING REQUEST EQUIPMENT | B |
| REQUEST DESTINATION EQUIPMENT | A |
| ASSOCIATED RESPONSE EQUIPMENT | C |
| REQUEST CONDITION | ΔT3 |
| RESPONSE IMAGE FILE NAME | Gc3 |

FIG. 24

| METADATA | |
|---|---|
| TRIGGER OUTPUT EQUIPMENT | B |
| TRIGGER JUDGMENT EQUIPMENT | B |
| SHOOTING REQUEST EQUIPMENT | B |
| REQUEST DESTINATION EQUIPMENT | C1 |
| ASSOCIATED RESPONSE EQUIPMENT | C1 |
| REQUEST CONDITION | ΔT4 |
| RESPONSE IMAGE FILE NAME | Gc41 |
| REQUEST DESTINATION EQUIPMENT | C2 |
| ASSOCIATED RESPONSE EQUIPMENT | C2 |
| REQUEST CONDITION | ΔT4 |
| RESPONSE IMAGE FILE NAME | Gc42 |

FIG. 25

| EVENT | TIME UNIT |
|---|---|
| GROWTH RECORDING SERIES | UNITS OF ONE DAY |
| STAGE | UNITS OF ONE HOUR |
| SCHEDULED | UNITS OF SEVERAL MINUTES |
| AFFAIR, ACCIDENT, SPORT | UNITS OF SECONDS |
| 3D SHOOTING | MOMENT |

FIG. 26

| SPORT PROGRESS | TIME |
|---|---|
| SHOT BY SO-AND-SO IN FIRST HALF | 9 MINUTES 30 SECONDS TO 9 MINUTES 40 SECONDS OF FIRST HALF |
| GOAL BY SO-AND-SO IN FIRST HALF | 13 MINUTES 30 SECONDS TO 14 MINUTES 40 SECONDS OF FIRST HALF |
| | |

IMAGE FILE CREATION APPARATUS, IMAGE FILE CREATION METHOD, RECORDING MEDIUM STORING IMAGE FILE CREATION PROGRAM, AND CONTENT CREATION SYSTEM

CROSS REFERENCE TO RELATED APPLICATION

This application is based upon and claims the benefit of priority from the prior Japanese Patent Application No. 2018-43314 filed in Japan on Mar. 9, 2018; the entire contents of which are incorporated herein by reference.

BACKGROUND OF THE INVENTION

Field of the Invention

The present invention relates to an image file creation apparatus, an image file creation method, a recording medium storing an image file creation program, and a content creation system, which make cooperative use of images easy.

Description of Related Art

In recent years, portable equipment (shooting equipment) with a shooting function such as digital cameras has various shooting functions that use image processing. Some kinds of shooting equipment have a communication function, and can also transmit an image obtained by shooting to other equipment or networks.

In the shooting equipment, when an image is recorded, auxiliary data (metadata) other than the image, for example, information of a shooting date and time and a shooting location, together with the image, is filed and recorded. That is, an image file includes image data and metadata, and can also be edited after being recorded. Japanese Patent Application Laid-Open Publication No. 2008-54155, for example, discloses a technique for adding metadata to be added in real time and metadata to be added in non-real time in performing image synthesis in a studio.

Examples of the shooting equipment include not only shooting equipment configured to perform shooting independently, like a general digital camera, but also shooting equipment configured to perform shooting with a plurality of cameras and a control apparatus cooperating with each other, like a monitoring camera. Images acquired by the pieces of shooting equipment have been respectively managed under their own rules in dedicated markets.

SUMMARY OF THE INVENTION

According to an aspect of the present invention, there is provided an image file creation apparatus including an acquisition circuit configured to acquire a picked-up image, and a processor configured to create an image file in recording the acquired image, in which the processor includes cooperation participation information for clarifying a relationship between the picked-up image and a cooperation image cooperating with the picked-up image as metadata in the image file, and the cooperation participation information includes at least one of (a) request information for requesting to provide the cooperation image cooperating with the picked-up image, and (b) provision information indicating whether or not the picked-up image can be provided as the cooperation image.

According to another aspect of the present invention, there is provided an image file creation method including acquiring a picked-up image, adding cooperation partition information including at least one of provision information for providing the picked-up image and request information for requesting to provide a cooperation image having a predetermined relationship with the picked-up image as metadata to the picked-up image, and including information about a request condition representing the predetermined relationship between the picked-up image and the cooperation image as the request information in the metadata.

According to still another aspect of the present invention, there is provided a non-transitory computer readable recording medium storing an image file creation program for causing a computer to acquire a picked-up image, add cooperation partition information including at least one of provision information for providing the picked-up image and request information for requesting to provide a cooperation image having a predetermined relationship with the picked-up image as metadata to the picked-up image, and include information about a request condition representing the predetermined relationship between the picked-up image and the cooperation image as the request information in the metadata.

According to a further aspect of the present invention, there is provided a content creation system including a content creation circuit provided in each of a plurality of pieces of equipment to create a cooperation content created by the plurality of pieces of equipment in cooperation, and a processor provided in each of the plurality of pieces of equipment, in which the processor provided in each of the plurality of pieces of equipment adds a relationship among contents constituting the cooperation content as metadata to each of the contents, and generates as the metadata information about the plurality of pieces of equipment as parties to the cooperation and request source information about a request source which outputs a cooperation condition.

According to a still further aspect of the present invention, there is provided an image file creation apparatus including an acquisition circuit configured to acquire a picked-up image, and a control circuit configured to create an image file in recording the acquired image, in which the control circuit includes cooperation participation information for clarifying a relationship between the picked-up image and a cooperation image cooperating with the picked-up image as metadata in the image file, and the cooperation participation information includes at least one of (a) request information for requesting to provide the cooperation image cooperating with the picked-up image, and (b) provision information indicating whether or not the picked-up image can be provided as the cooperation image.

BRIEF DESCRIPTION OF THE DRAWINGS

FIG. 1 is a block diagram illustrating an information processing system by an information processing apparatus including an image file creation apparatus according to a first embodiment of the present invention;

FIG. 7 is an explanatory diagram illustrating a content of metadata of the image Gc1 illustrated in FIG. 5B;

FIG. 8 is an explanatory diagram illustrating a content of metadata of the image Gc2 illustrated in FIG. 6B;

FIG. 14 is an explanatory diagram for describing a configuration example of an image file;

FIG. 15 is an explanatory diagram for describing a configuration example of an image file;

FIG. 23 is an explanatory diagram illustrating metadata of the camera 120 corresponding to FIG. 17;

FIG. 24 is an explanatory diagram illustrating metadata of the camera 120 corresponding to FIG. 20;

FIG. 25 is an explanatory diagram for describing an example of a method for determining a request condition; and FIG. 26 is an explanatory diagram for describing an example of a method for determining a request condition.

DETAILED DESCRIPTION OF PREFERRED EMBODIMENTS

Under an IoT environment, results obtained by various apparatuses for various types of information can be effectively used. On the other hand, evidence as to which pieces of equipment have cooperated with one another becomes important. A configuration, described below, enables, when many pieces of equipment have acquired information in cooperation, a master-slave relationship among the pieces of equipment, for example, to be recorded in a file of the information. Accordingly, information about the IoT environment remains in an image file obtained by shooting. Information as to which machine has issued an instruction and how shooting has been performed can be grasped from only the image file when used later. An invention for clarifying the evidence is expected to have application examples in various fields, and many embodiments are illustrated as examples in the present application. However, a basic inventive concept is common. Although applicable to various types of information, the present invention particularly describes an example of an application to an image, and illustrates as examples an image file creation apparatus, an image file creation method, a recording medium storing an image file creation program, and a content creation system, which enable images respectively acquired by different pieces of equipment to be easily cooperatively used to promote effective use of the images.

Embodiments of the present invention will be described in detail below with reference to the drawings.

First Embodiment

FIG. 1 is a block diagram illustrating an information processing system by an information processing apparatus including an image file creation apparatus according to a first embodiment of the present invention. The present embodiment enables a plurality of pieces of shooting equipment to perform shooting in cooperation by adding cooperation participation information for providing an image to other equipment or requesting to provide an image to other equipment as metadata to an image file and recording the cooperation participation information and enables picked-up images respectively obtained by the plurality of pieces of shooting equipment performing shooting to be cooperatively used. Note that the cooperation participation information includes provision information for providing an image and request information for requesting to provide an image. "Cooperation participation information" may be expressed as "cooperation party information" in the sense of collaborating while cooperating more positively.

Figure 2A:
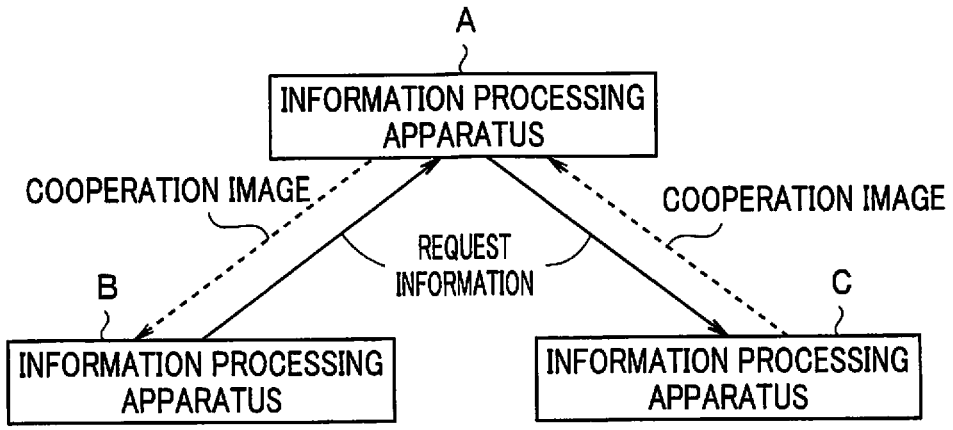
FIG. 2A is an explanatory diagram indicating that information processing apparatuses A to C cooperate with one another.
Figure 2B:
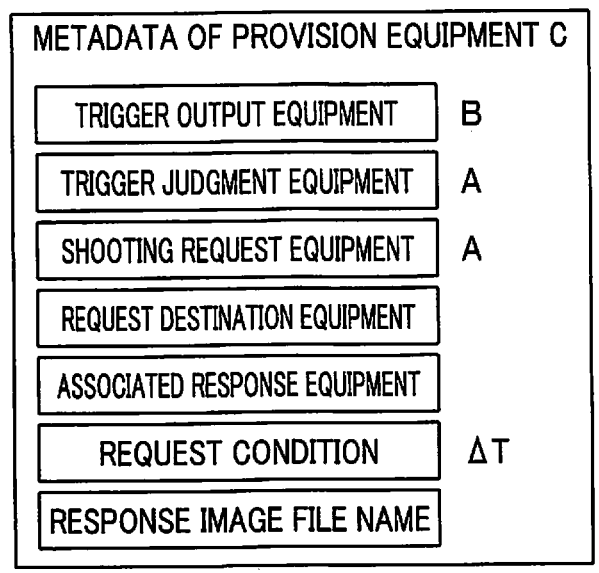
FIG. 2B is an explanatory diagram illustrating a content of metadata appended to an image file recorded in the information processing apparatus C illustrated in FIG. 2A.
Figure 3A:
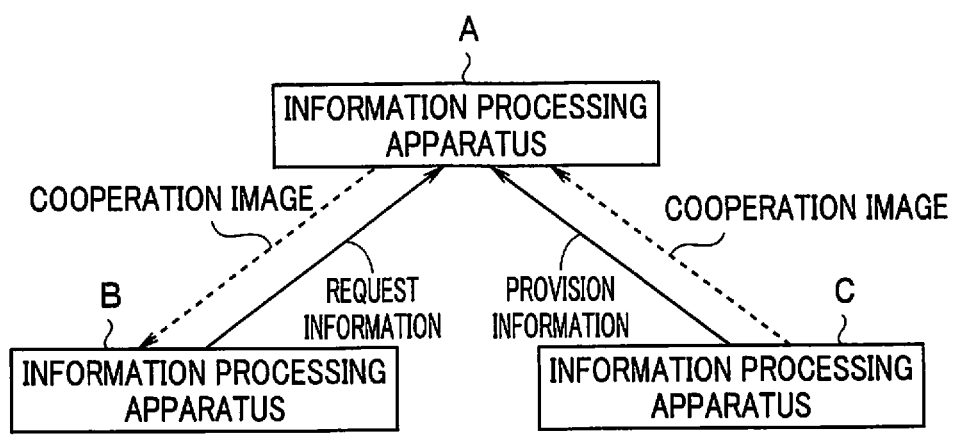
FIG. 3A is an explanatory diagram indicating that the information processing apparatuses A to C cooperate with one another.
Figure 3B:
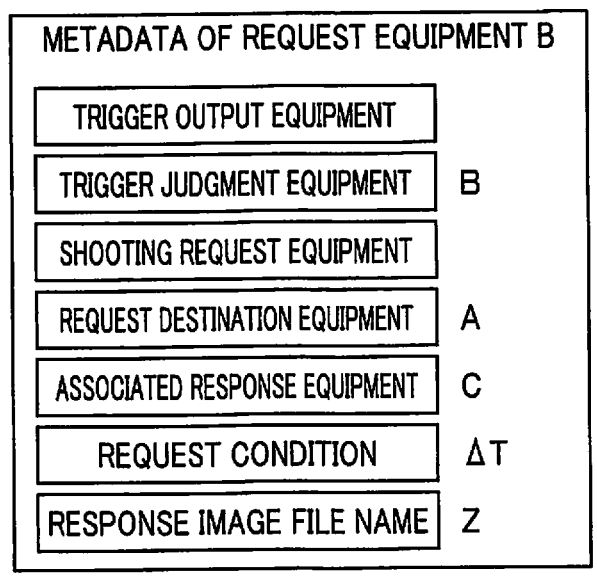
FIG. 3B is an explanatory diagram illustrating a content of metadata appended to image files respectively recorded in the information processing apparatuses B and C illustrated in FIG. 3A.
Figure 3C:
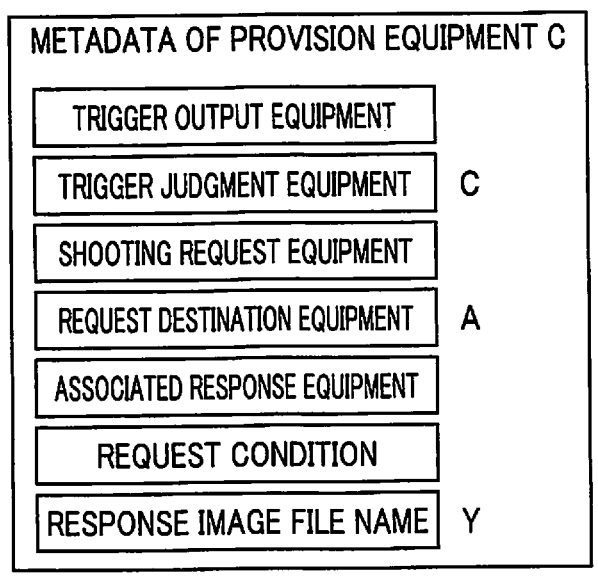
FIG. 3C is an explanatory diagram illustrating a content of metadata appended to image files respectively recorded in the information processing apparatuses B and C illustrated in FIG. 3A.

First, an outline of the present embodiment will be described with reference to FIGS. 2A and 2B and FIGS. 3A, 3B, and 3C. FIGS. 2A and 3A are explanatory diagrams each indicating that information processing apparatuses A to C cooperate with one another. FIG. 2B is an explanatory diagram illustrating a content of metadata appended to an image file recorded in the information processing apparatus C illustrated in FIG. 2A, and FIGS. 3B and 3C are explanatory diagrams respectively illustrating contents of metadata appended to image files recorded in the information processing apparatuses B and C illustrated in FIG. 3A. Note that, although FIGS. 2A and 3A each illustrate an example in which the three information processing apparatuses A, B, and C cooperate with one another, the information processing apparatus A is a parent apparatus which may or may not have an image pickup function and mainly has a management function. FIG. 3A illustrates a significantly simplified example. The information processing apparatus B and the information processing apparatus C may directly cooperate with each other. In this case, the function of the information processing apparatus A is contained in or shared between the image processing apparatuses B and C. The present application describes a configuration in a simplified manner for the purpose of simple description while considering and covering such a situation.

In the example illustrated in FIG. 2A, the information processing apparatus B requests an image having a predetermined relationship with an image acquired by its own equipment performing image pickup (hereinafter referred as a cooperation image) of the information processing apparatus A, and the information processing apparatus A requests the information processing apparatus C to provide a cooperation image in response to the request of the information processing apparatus B, to enable the provision of the cooperation image to the information processing apparatus B. The information processing apparatus B records request information indicating that it desires to acquire the cooperation image as metadata of an image to be picked up by the information processing apparatus B (hereinafter referred to as a cooperation source image).

Note that equipment configured to request to provide a cooperation image (the information processing apparatus B in FIG. 2A) is also referred to as request equipment, equipment configured to provide a cooperation image (the information processing apparatus C in FIG. 2A) is also referred to as provision equipment, and equipment configured to relay between the request equipment and the provision equipment (the information processing apparatus A in FIG. 2A) is also referred to as management equipment.

Note that, although the image processing apparatus A may enable forced acquisition of a cooperation image from the image processing apparatus C when it controls shooting of the image processing apparatus C, the image processing apparatus C records provision information indicating that an image acquired by its own equipment performing image pickup may be provided as a cooperation image to other equipment as metadata of the acquired image in consideration of a case where the information processing apparatus A does not control the shooting of the information processing apparatus C.

In a stage where request information is recorded as metadata, a cooperation image itself requested by request information need not be transferred from equipment configured to provide a cooperation image, but only information such as a file name for specifying a cooperation image scheduled to be provided is provided in place of the cooperation image. As a result, only a truly necessary image may be transferred so that a load of communication caused by transfer of a cooperation image can be reduced.

FIGS. 2B, 3B, and 3C respectively illustrate metadata appended to cooperation source images acquired by the apparatuses. Note that, although metadata includes metadata defined by an Exif (exchangeable image file format) standard, description of the metadata defined by the Exif standard is omitted in the following description.

In the present embodiment, to enable cooperative shooting while enabling cooperative use of a picked-up image, metadata includes seven types of information (a) to (g) as cooperation participation information, as illustrated in FIGS. 2B, 3B, and 3C. Note that the information includes not only information added when a cooperation source image or a cooperation image is shot but also information added after cooperation after the shooting. The cooperation participation information is information for clarifying a relationship between a picked-up image and an image cooperating with the picked-up image.

The following three types of information (a) to (c) relate to provision information. Note that in equipment configured to request to provide a cooperation image, provision information is also recorded, if necessary. As a result, it can also be grasped what relationship holds between a cooperation image and a cooperation source image from one image file.

(a) Trigger output equipment information represents equipment which has generated a trigger for shooting of a cooperation image, i.e., equipment which has shot a cooperation source image, and is omitted when unclear or not present.

(b) Trigger judgment equipment information represents equipment which has determined a timing of a trigger for shooting of a cooperation image, and becomes information representing its own equipment and can be omitted when the shooting is not controlled by external equipment.

(c) Shooting request equipment information represents equipment at a request source configured to directly request to perform shooting, and becomes information representing its own equipment and can be omitted when the shooting is not controlled by external equipment. Note that the information types (a) to (c) become blank (no data) when a cooperation image is not provided, and at least the trigger judgment equipment information (b) becomes information representing the own equipment or other equipment when the cooperation image may be provided.

The following four types of information (d) to (g) are respectively request information relating to cooperation. Note that request information is recorded, if necessary, in equipment configured to provide a cooperation image. As a result, a relationship between a cooperation source image and a cooperation image can be grasped from one image file.

(d) Request destination equipment information represents equipment at a request destination of provision of a cooperation image, and specific equipment or a broadcast is designated when the information requests to provide the cooperation image.

(e) Associated response equipment information represents equipment at a supply source of a cooperation image, and is not necessarily determined even when pieces of equipment cooperate with one another. When the information is blank, a cooperation image using an image obtained by its own equipment performing image pickup as a cooperation source image does not exist.

(f) Request condition information represents a condition in requesting to provide a cooperation image, and examples can include various types of information such as a time, a location, and a video parameter. That is, the request condition information becomes information representing an association between a cooperation source image and the cooperation image. Note that a request condition is a condition for determining a cooperation target or a cooperation method, and may be said to be a cooperation condition. Particularly, the request condition can also be generated from the side of not only request equipment but also provision equipment, and may be said to be a cooperation condition in this case.

(g) Response image file name information represents an image file name of a cooperation image to be provided for request equipment and an image file name of a cooperation source image for provision equipment, and is generally unclear at the time of a request.

Note that the information (d) to (g) become blank if no request to provide a cooperation image is made, and all the information (a) to (g) become blank if no participation in cooperation is made.

FIG. 2B illustrates metadata added to a picked-up image (cooperation image) acquired by the information processing apparatus C (hereinafter also referred to as provision equipment C in this case) illustrated in FIG. 2A. In an example illustrated in FIG. 2B, the information processing apparatus B (hereinafter also referred to as request equipment B in this case) requests to supply an image picked up until after ΔT seconds since the own equipment shot a cooperation source image as a cooperation image. In this case, the information processing apparatus A controls shooting by the provision equipment C. Accordingly, request information from the request equipment B (a request source) is supplied to the information processing apparatus A. The information processing apparatus A is management equipment configured to manage cooperation between the request equipment B and the provision equipment C, and is also referred to as management equipment A.

As apparent from trigger judgment equipment information illustrated in FIG. 2B, the shooting by the provision equipment C is controlled by the management equipment A, and shooting request equipment information represents the management equipment A. Note that a cooperation image acquired by the provision equipment C also includes request condition information.

FIG. 3A illustrates an example in which the information processing apparatus B is request equipment (hereinafter also referred to as request equipment B or a request source in this case) and the information processing apparatus C is provision equipment (hereinafter also referred to as provision equipment C in this case). However, in the example illustrated in FIG. 3A, the information processing apparatus A is management equipment (hereinafter also referred to as management equipment A in this case) which does not control shooting of the information processing apparatus C but merely manages cooperation within a predetermined network.

FIG. 3B illustrates metadata to be added to a picked-up image (a cooperation source image) (an image file name Y) acquired by the request equipment B illustrated in FIG. 3A, and FIG. 3C illustrates metadata to be added to a picked-up image (a cooperation image) (an image file name Z) acquired by the provision equipment C illustrated in FIG. 3A. As illustrated in FIG. 3B, the request equipment B requests the management equipment A to supply a cooperation image. Request condition information indicates that an image obtained by shooting after ΔT seconds from a cooperation source image is requested as a cooperation image.

The provision equipment C performs shooting by an operation of the own equipment, and trigger judgment equipment information is C representing the own equipment. Request destination equipment information represents the request equipment A. The provision equipment C records a cooperation image in a file name Z, and information about the file name is supplied to the request equipment B via the management equipment A, for example, and is recorded on metadata. In the provision equipment C, associated response equipment information is blank, and a cooperation image using an image of the file name Z picked up by the own equipment as a cooperation source image does not exist.

Note that, although FIGS. 3A to 3C illustrate an example in which the provision equipment C provides only one cooperation image, the provision equipment C can also provide a plurality of cooperation images. In this case, metadata having a plurality of response image file name information (g) provided for each cooperation image is added in an image file of one cooperation source image in the request equipment B.

Although FIGS. 3A to 3C illustrate an example in which the number of pieces of provision equipment is one, a plurality of pieces of provision equipment may exist for one request equipment B. In this case, metadata having respective pluralities of pieces of information (d) to (g) provided for each provision equipment is added in an image file of one cooperation source image in the request equipment B.

Although FIGS. 2A and 3A describe an example in which the information processing apparatuses B and C cooperate with each other via the management equipment A, the information processing apparatus B and the information processing apparatus C may evidently cooperate with each other by directly communicating with each other. In this case, the information processing apparatus A is not required.

According to the present embodiment, when information required for cooperation is added as metadata to an image and is recorded, cooperative shooting can be simply performed. Information about cooperation is recorded as metadata in an image file. Therefore, it can be easily judged what cooperation is performed to perform shooting from one image file after the recording. As a result, images respectively acquired by different pieces of equipment can be cooperatively used, and effective use can be promoted.

(Specific Example)

A specific application example will be described below with reference to FIG. 1.

FIG. 1 illustrates cooperation among an operation judgment apparatus 10, a wearable terminal apparatus 20, and a camera 30. An example in which the operation judgment apparatus 10 is request equipment and management equipment, the wearable terminal apparatus 20 is request equipment, and the camera 30 is provision equipment will be described. FIG. 1 illustrates an example in which an information processing apparatus according to the present embodiment is applied to an operation support system 1. The operation support system 1 can provide operation support for reliably performing a series of predetermined operations including a plurality of operations according to a defined procedure or method while performing evidence recording relating to each of the performed operations. Therefore, the operation support system 1 includes a plurality of image pickup apparatuses and a control apparatus configured to control the plurality of image pickup apparatuses in cooperation. Note that in the present embodiment, an example in which the wearable terminal apparatus 20 and the camera 30 respectively configure two image pickup apparatuses and the operation judgment apparatus 10 configures a control apparatus is illustrated in FIG. 1.

According to the configuration, the operation support system 1 illustrated in FIG. 1 displays an operation content and an operation procedure of each of operations included in a series of operations of interest based on an information collection (a database) about a plurality of operations previously determined and a plurality of image data (acquired image data) about the operation actually performed to guide the operation, and performs confirmation and judgment as to the operations, for example, whether or not each of the operations has been correctly performed or whether or not a correct operation procedure has been performed, to provide operation support, for example, to perform evidence recording if a correct operation has been performed while emitting a warning or the like to an operator to urge the operator to perform the correct operation if an erroneous operation is performed.

The operation judgment apparatus 10 controls each of the wearable terminal apparatus 20 and the camera 30, confirms and judges each of the performed operations based on image data (still image data (second image data), movie data (first image data), etc.) acquired by the wearable terminal apparatus 20 and the camera 30, and controls operations such as operation recording (evidence recording). The operation judgment apparatus 10 performs control, for example, the wearable terminal apparatus 20 and the camera 30 to operate in cooperation. Therefore, the operation judgment apparatus 10 is configured to include a control unit 11, a communication unit 12, a database 13, a recording unit 14, and the like.

Note that the operation judgment apparatus 10 according to the present embodiment includes various types of components provided in a general control apparatus, for example, an operation unit and a display unit, illustration of which is omitted, in addition to the above-described components. The various types of components, illustration of which is omitted, are not directly associated with the present invention, and hence detailed description of the components is omitted.

The control unit 11 is a constituent unit including a plurality of control circuits configured to integrally control the entire operation support system 1 according to the present embodiment. For example, the control unit 11 may be configured by a processor using a CPU (central processing unit), an FPGA (field-programmable gate array), or the like, may operate according to a program stored in a memory (not illustrated) to control each of the units, or may have functions some or all of which are each implemented by a hardware electronic circuit. The plurality of control circuits, for example, included in the control unit 11 particularly include an operation judgment unit 11a, a display control unit 11b, a guide unit 11c, a target judgment unit 11d, a recording control unit 11e, and the like. Note that the image file creation apparatus mainly includes the control unit 11 and the recording unit 14.

The operation judgment unit 11a is a constituent unit including, for example, a control circuit configured to confirm and judge, for example, each of items relating to a performed operation based on image data acquired by the wearable terminal apparatus 20 and the camera 30, information previously stored in the database 13, judgment result information acquired by the target judgment unit 11d and the recording control unit 11e, and the like. Note that examples of the judgment to be performed here include judgment of a type of a tool used for operations and judgment of a type of each of the operations.

The display control unit 11b is a constituent unit including, for example, a control circuit configured to control a display unit (not illustrated) included in the operation judgment apparatus 10 or display units (25 and not illustrated) respectively included in the wearable terminal apparatus 20 and the camera 30 which cooperate with the operation judgment apparatus 10, for example, to perform predetermined display (warning display, etc. in addition to image display).

The guide unit 11c is a constituent unit including, for example, a control circuit configured to generate guide information for performing guide display relating to a performed operation, guide display of an operation to be next performed, and the like based on image data acquired by the wearable terminal apparatus 20 and the camera 30 and information previously stored in the database 13.

The target judgment unit 11d is a constituent unit including, for example, a control circuit configured to detect and judge a predetermined condition such as a type, a site, a shape, a size, a number, and a state of predetermined targets included in image data based on image data acquired by the wearable terminal apparatus 20 and the camera 30 and information previously stored in the database 13. Note that the target judgment unit 11d can use means for calculating a size of a target formed on a light receiving surface of an image pickup device from a relationship between a distance between an image pickup apparatus and the target and a size of the image pickup device using an automatic focusing mechanism, for example, in addition to the foregoing.

The recording control unit 11e controls recording and reproduction in the recording unit 14. The recording unit 14 is a constituent unit including, for example, a control circuit and a recording medium configured to record image data acquired by the wearable terminal apparatus 20 and the camera 30, or the like, and operation information associated with the image data. Note that images from more fields of view, ranges of view, and points of view may be able to be referred to.

In the present embodiment, the recording unit 14 includes an image data recording region 14a, a metadata recording region 14b, and an equipment data recording region 14c. The recording control unit 11e records image data in the image data recording region 14a when an image is recorded while recording metadata in the metadata recording region 14b in association with the image data to be recorded. As described above, the metadata includes cooperation participation information, i.e., request information and provision information. Equipment data for specifying its own equipment is recorded in the equipment data recording region 14c, and the recording control unit 11e includes equipment data in reading out the request information and the provision information to transmit the information.

The communication unit 12 is a transmission unit and a receiving unit including, for example, a control circuit configured to perform data communication (information transmission and receiving) between respective communication units (22 and 32) in the wearable terminal apparatus 20 and the camera 30. The communication unit 12 may be configured to use wireless communication or may be configured to use wired communication. In the present embodiment, the control unit 11 can cause the communication unit 12 to transmit the request information and the provision information including equipment data.

The database 13 is a storage device (an auxiliary storage device) storing various types of information previously determined. An example in which the database 13 is configured to be included in the operation judgment apparatus 10 (specifically, an internal fixation type storage medium (a built-in memory) or a detachable type storage medium (a detachable card type memory)) is illustrated. However, the configuration of the database 13 is not limited to such forms. For example, the database may be configured by an external storage device having an independent form. Note that in this case, the database having an independent configuration and the operation judgment apparatus 10 may be configured to be able to transmit and receive various types of data between each other using predetermined wireless or wired connection means.

The database 13 stores an operation information database 13a and an image database 13b, for example. The operation information database 13a includes various types of information about a plurality of operations (target information, used tool information, operation type information, etc.). The image database 13b is an image data collection associated with various types of information recorded in the operation information database 13a (e.g., image information from a plurality of fields of view relating to a plurality of operations).

Figure 4:
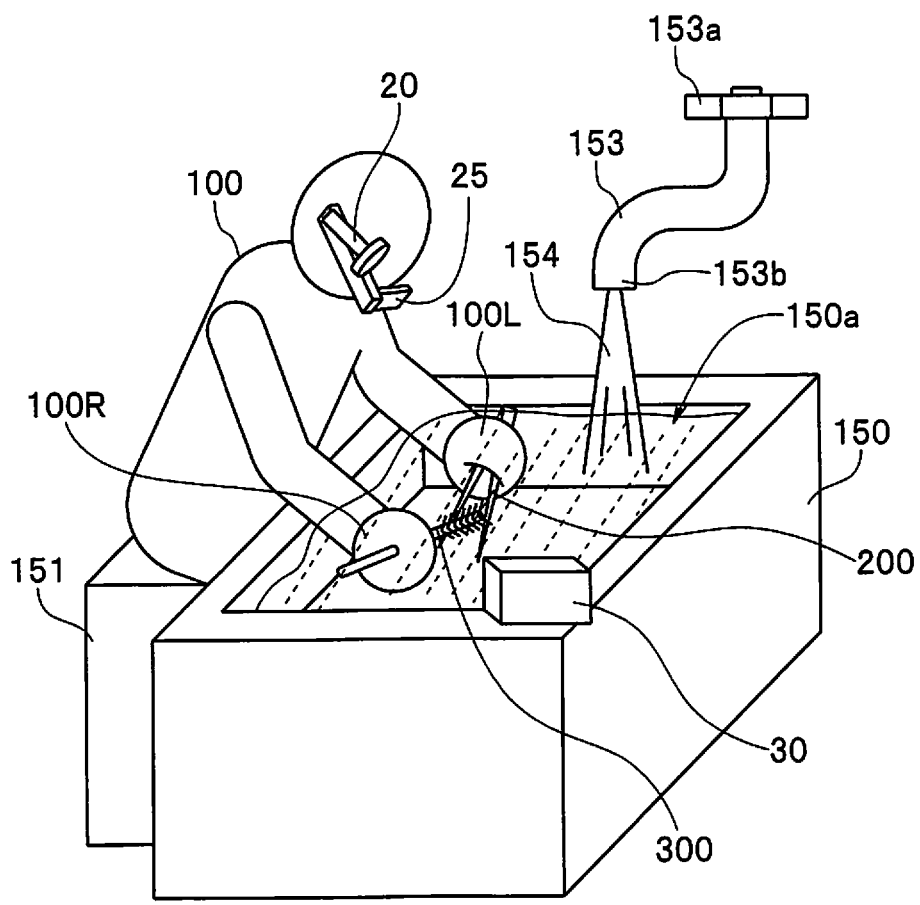
FIG. 4 is a conceptual diagram illustrating how a predetermined maintenance operation (instrument washing and sterilization operation) is being performed using an operation support system according to the present embodiment.

The wearable terminal apparatus 20 is an image pickup apparatus having a form which enables an operator 100 to freely use both his/her hands when worn on a part of a body of the operator 100 (e.g., the vicinity of a face of the operator 100) and at the same time can always pick up an image of a state in the vicinity of the hand of the operator 100, as illustrated in FIG. 4, for example. In other words, the wearable terminal apparatus 20 is an image pickup apparatus having a form capable of acquiring operation information corresponding to an eye line of the operator 100.

The wearable terminal apparatus 20 mainly acquires movie data as first image data. The movie data is used to grasp a flow of frequent operations by the operator, and may be a still image in which a time change is recognizable or data information representing a time change of an image such as a motion vector extracted from the still image. However, if the movie data is used for evidence, the data information is preferably a still image which can be verified later by a person.

The wearable terminal apparatus 20 includes a control unit 21, a communication unit 22, a recording unit 23, an image pickup unit 24 as an acquisition circuit, a display unit 25, a warning unit 26, a clock unit 27, and the like. The control unit 21 is a constituent unit including, for example, a control circuit configured to integrally control the entire wearable terminal apparatus 20. The control unit 21 is configured by a processor using a CPU or the like. The control unit 21 controls each of the constituent units by operating according to a program stored in a memory (not illustrated). Note that the image file creation apparatus mainly includes the control unit 21 and the recording unit 23.

The wearable terminal apparatus 20 is an image pickup apparatus configured to independently function under control of the control unit 21, and at the same time to also function under control of the control unit 11 in the operation judgment apparatus 10 by communicating with the operation judgment apparatus 10. Note that, although the wearable terminal apparatus 20 is an image pickup apparatus configured to mainly acquire movie data, the present invention is not limited to this. For example, the wearable terminal apparatus 20 may be configured to be able to optionally or automatically acquire still image data simultaneously with movie data or independently using a predetermined operation by the operator or a predetermined action as a trigger.

The control unit 21 performs various types of control, for example, controls the communication unit 22 to transmit and receive (communicate) various types of information to and from (with) the operation judgment apparatus 10, controls the image pickup unit 24 to acquire image data or the like, and controls the display unit 25 to perform various types of information display on a display screen. Note that the communication unit 22 also functions as an acquisition circuit configured to acquire an image. In addition to the controls, the control unit 21 controls the wearable terminal apparatus 20 in cooperation with the operation judgment apparatus 10 upon receiving a control signal from the control unit 11 in the operation judgment apparatus 10.

The control unit 21 includes a plurality of circuit units such as an image judgment unit 21a and a display control unit 21b. The image judgment unit 21a is a judgment processing circuit configured to perform predetermined judgment based on the image data acquired by the image pickup unit 24. The image judgment unit 21a is a circuit unit which is similar to or simpler than the judgment units 11a and 11d included in the control unit 11 in the operation judgment apparatus 10, described above.

That is, the image judgment unit 21a functions as an operation judgment unit configured to judge first image data and second image data according to operation information in the database 13. Accordingly, if the control unit 11 in the operation judgment apparatus 10 is provided with the judgment units 11a and 11d, the image judgment unit 21a can also be omitted.

If the image judgment unit 21a is provided on the side of the wearable terminal apparatus 20, only a judgment result by the image judgment unit 21a may be transmitted to the control unit 11 in the operation judgment apparatus 10 via the communication units (22 and 12). Upon receiving the judgment result, the control unit 11 in the operation judgment apparatus 10 performs control based on information about the received judgment result. Accordingly, such a configuration has an advantage that a communication load can be reduced.

The display control unit 21b is a control circuit unit configured to control the display unit 25 to perform predetermined display on a display screen. The communication unit 22 is a transmission unit and a receiving unit including, for example, a control circuit configured to perform communication (information transmission and receiving) with the operation judgment apparatus 10. Predetermined wireless or wired communication means is applied to the communication unit 22. The communication unit 22 also functions as a communication unit configured to acquire second image data from the camera 30 provided at a different position from a position of the wearable terminal apparatus 20 via the operation judgment apparatus 10.

Further, the communication unit 22 can also refer to operation information of the database 13 by communicating with the database 13 via the operation judgment apparatus 10. Note that the communication unit 22 and the database 13 may directly communicate with each other.

The image pickup unit 24 is a constituent unit configured to include an image pickup optical system, an image pickup device and a driving control circuit for the image pickup device (not illustrated), for example. The image pickup unit 24 has functions of sequentially photoelectrically converting an optical image of an image pickup target formed by the image pickup optical system using the image pickup device and sequentially displaying an image based on image data obtained by the photoelectric conversion on the display screen of the display unit 25. The image pickup unit 24 has a function of forming image data (e.g., movie data or still image data) having a predetermined form based on the obtained image signal, recording the image data, and transmitting the image data to the operation judgment apparatus 10 via the communication units 22 and 12, for example. A configuration of the image pickup unit 24 itself having the functions is substantially similar to a configuration of an image pickup unit in a conventionally general image pickup device. Therefore, its detailed configuration and illustration are omitted.

Note that photoelectric conversion elements such as a CCD (charge coupled device) image sensor and a CMOS (complementary metal oxide semiconductor) image sensor, for example, are applied as the image pickup device. In such an image pickup unit, an image close to an eye line (a range of field and a field of view) of an operator during an operation is obtained, and a detailed operation (also including a visible observation check) using both hands of the operator performed between both the hands is easily confirmed.

The display unit 25 is a constituent unit including, for example, a display control circuit configured to be able to display, in addition to displaying an image based on image data acquired by the image pickup unit 24, various types of warnings, or various types of predetermined messages or guides (details of which is described below), for example, with the warnings or the messages or the guides overlaid on the image while performing menu display for various types of settings, for example, in the wearable terminal apparatus 20 by switching a predetermined operation mode, as needed.

The display unit 25 in the wearable terminal apparatus 20 is arranged in the vicinity of the face of the operator 100, as illustrated in FIG. 4. For example, the display unit 25 is configured to include a light guide portion and a display screen, for example (not illustrated), to be able to form an image in a direction of a line of sight of the operator 100. Note that a liquid crystal display (LCD) unit or an organic electro-luminescence (OEL) display unit, for example, is applied to the display screen.

A region of an image formed by the display unit 25 is a sufficient region not to block a field of view of the operator 100, and the operator 100 can visually recognize all fields of view of both his/her right and left eyes in a normal state while visually recognizing a display content using the display unit 25 in a predetermined range in the field of view by moving the line of sight.

Note that the wearable terminal apparatus 20 in the present embodiment includes a battery as a power supply source, illustration of which is omitted. The battery generates power required to drive the wearable terminal apparatus 20, and is controlled by the control unit 21, to supply the power to each of the constituent units.

When the image pickup optical system in the image pickup unit 24 is oriented in a direction substantially matching a direction of the line of sight of the operator with the wearable terminal apparatus 20 worn by the operator 100, an image acquired by the image pickup unit 24 becomes an image in a predetermined region including a direction of viewing by the operator (the direction of the line of sight).

In the present embodiment, the recording unit 23 includes an image data recording region 23a, a metadata recording region 23b, and an equipment data recording region 23c. The control unit 21 records image data in the image data recording region 23a while recording metadata in the metadata recording region 23b in association with the image data to be recorded in recording an image. As described above, the metadata includes cooperation participation information, i.e., request information and provision information. Equipment data for specifying its own equipment is recorded in the equipment data recording region 23c, and the control unit 21 includes equipment data in reading out the request information and the provision information to transmit the information.

On the other hand, the camera 30 is an image pickup apparatus having a general form or an image pickup apparatus placed or fixedly provided at a predetermined position in the vicinity of an operation table (not illustrated), for example. In other words, the camera 30 is an image pickup apparatus having a form in which operation information different from operation information corresponding to the eye line of the operator can be acquired.

The camera 30 preferably has information about a so-called objective viewpoint from a field of view different from an image of the eye line of the operator (information becomes rich as a system), and mainly acquires still image data as second image data. This is because the still image data is preferably a still image which can be verified later by a person when used for evidence. However, the still image becomes a movie when continuously acquired. Therefore, if there are no problems in energy consumption and a recording capacity, there may be such applications.

A configuration of the camera 30 is substantially similar to a configuration of an image pickup apparatus having a general form. For example, the camera 30 is configured to include at least a control unit 31, a communication unit 32, an image pickup unit 34 as an acquisition circuit, and the like. Note that, an image file creation apparatus mainly includes a control unit 31 and a recording unit 33.

The control unit 31 is a constituent unit including, for example, a control circuit configured to integrally control the entire camera 30. The control unit 31 is configured by a processor using a CPU, for example. The control unit 31 controls each of the constituent units by operating according to the program stored in the memory (not illustrated).

The control unit 31 performs various types of control, for example, controls the communication unit 32, to transmit and receive (communicate) various types of information with the operation judgment apparatus 10, and controls the image pickup unit 34 to acquire image data. In addition to the controls, the control unit 31 controls the camera 30 in cooperation with the operation judgment apparatus 10 upon receiving the control signal from the control unit 11 in the operation judgment apparatus 10.

The communication unit 32 is a transmission unit and a receiving unit including, for example, a control circuit configured to perform communication (information transmission and receiving) with the operation judgment apparatus 10. Predetermined wireless or wired communication means is applied to the communication unit 32. Note that the communication unit 32 can also refer to operation information of the database 13 by communicating with the database 13 via the operation judgment apparatus 10. The communication unit 32 and the database 13 may directly communicate with each other.

The image pickup unit 34 is a constituent unit configured to include an image pickup optical system, an image pickup device and a driving control circuit for the image pickup device (not illustrated), for example. The image pickup unit 34 has functions of sequentially photoelectrically converting an optical image of an image pickup target formed by the image pickup optical system using the image pickup device and transmitting image data obtained by the photoelectric conversion to the operation judgment apparatus 10 via the communication unit 32, for example. The image pickup unit 34 also simultaneously has a function of sequentially displaying an image based on the image data using a display unit (not illustrated).

In the present embodiment, a recording unit 33 is provided. The recording unit 33 includes an image data recording region 33a, a metadata recording region 33b, and an equipment data recording region 33c. The control unit 31 records image data in the image data recording region 33a while recording metadata in the metadata recording region 33b in association with the image data to be recorded in recording an image. As described above, the metadata includes cooperation participation information, i.e., request information and provision information. Equipment data for specifying its own equipment is recorded in the equipment data recording region 33c, and the control unit 31 includes equipment data in reading out the request information and the provision information to transmit the information.

A configuration of the image pickup unit 34 itself having such a function is substantially similar to a configuration of an image pickup unit in the wearable terminal apparatus 20 or a conventionally general image pickup apparatus. The image pickup unit 34 also includes constituent members (an operation unit, a display unit, a battery, etc.) provided in the image pickup apparatus having a conventionally general form, illustration of which is omitted in FIG. 1. The constituent members each have a similar configuration and function to a configuration and a function of the image pickup apparatus having the conventionally general form, and hence detailed description of the configuration and the function is omitted.

Note that the camera 30 may also be configured by providing the control unit 31 with an image judgment unit (operation judgment unit). If the control unit 31 in the camera 30 is provided with the image judgment unit, the camera 30 may transmit only a judgment result by the image judgment unit to the control unit 11 in the operation judgment apparatus 10 via the communication units (32, 12), like when the control unit 21 in the wearable terminal apparatus 20 is provided with the image judgment unit 21a. Upon receiving the judgment result, the control unit 11 in the operation judgment apparatus 10 performs control based on information about the received judgment result. Accordingly, such a configuration has an advantage that a communication load can be reduced.

Figure 5A:
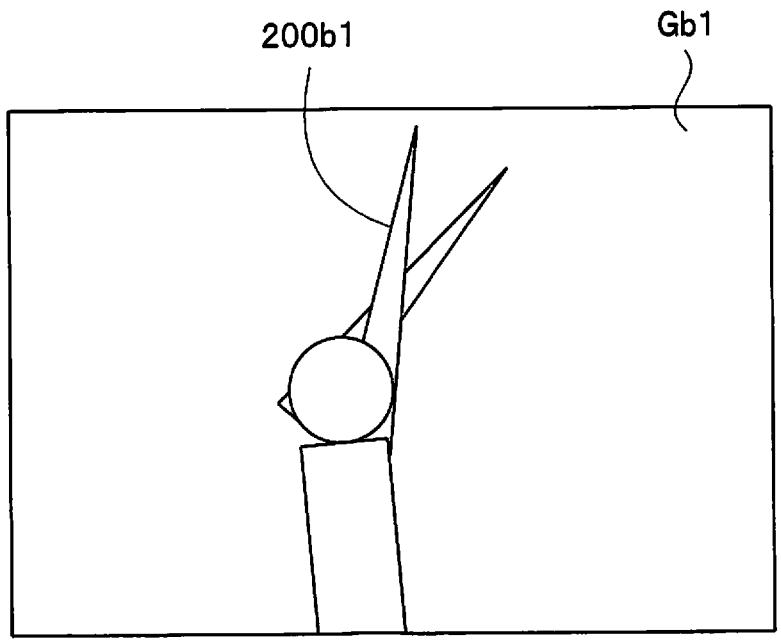
FIG. 5A is an explanatory diagram illustrating an image Gb1 acquired by a wearable terminal apparatus 20.
Figure 5B:
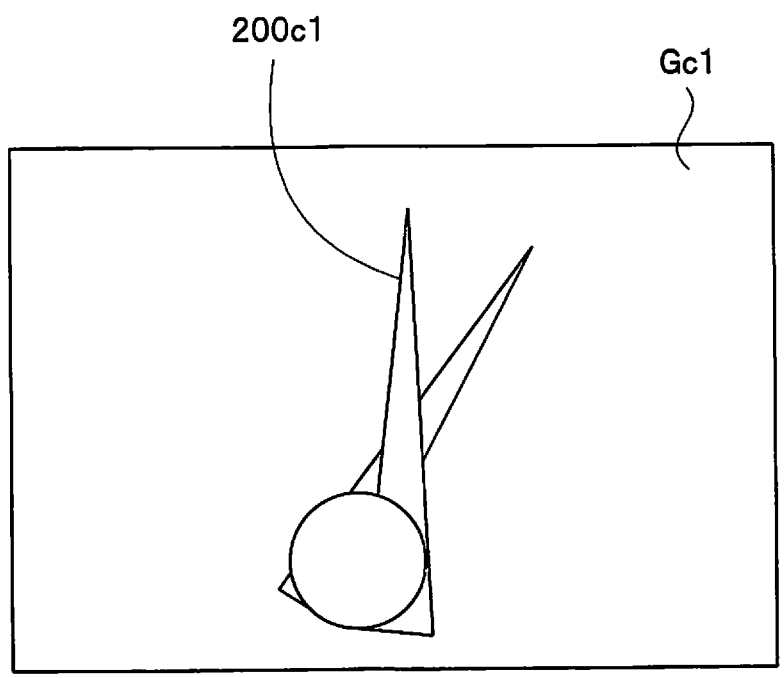
FIG. 5B is an explanatory diagram illustrating an image Gc1 acquired by a camera 30.
Figure 6A:
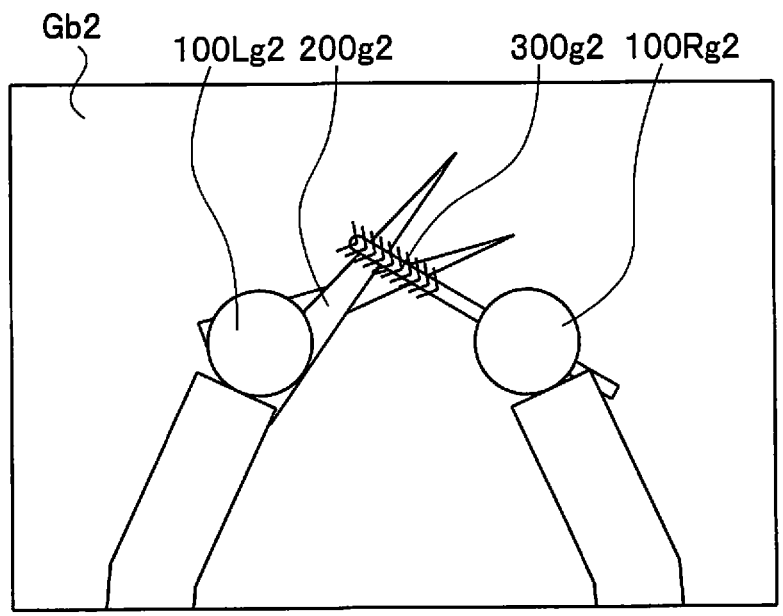
FIG. 6A is an explanatory diagram illustrating an image Gb2 acquired by the wearable terminal apparatus 20.
Figure 6B:
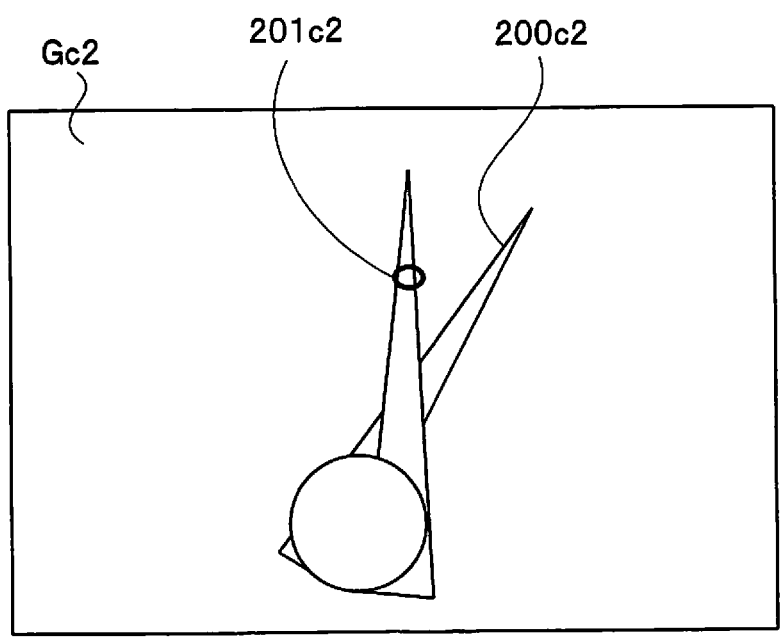
FIG. 6B is an explanatory diagram illustrating an image Gc2 acquired by the camera 30.
Figure 9:
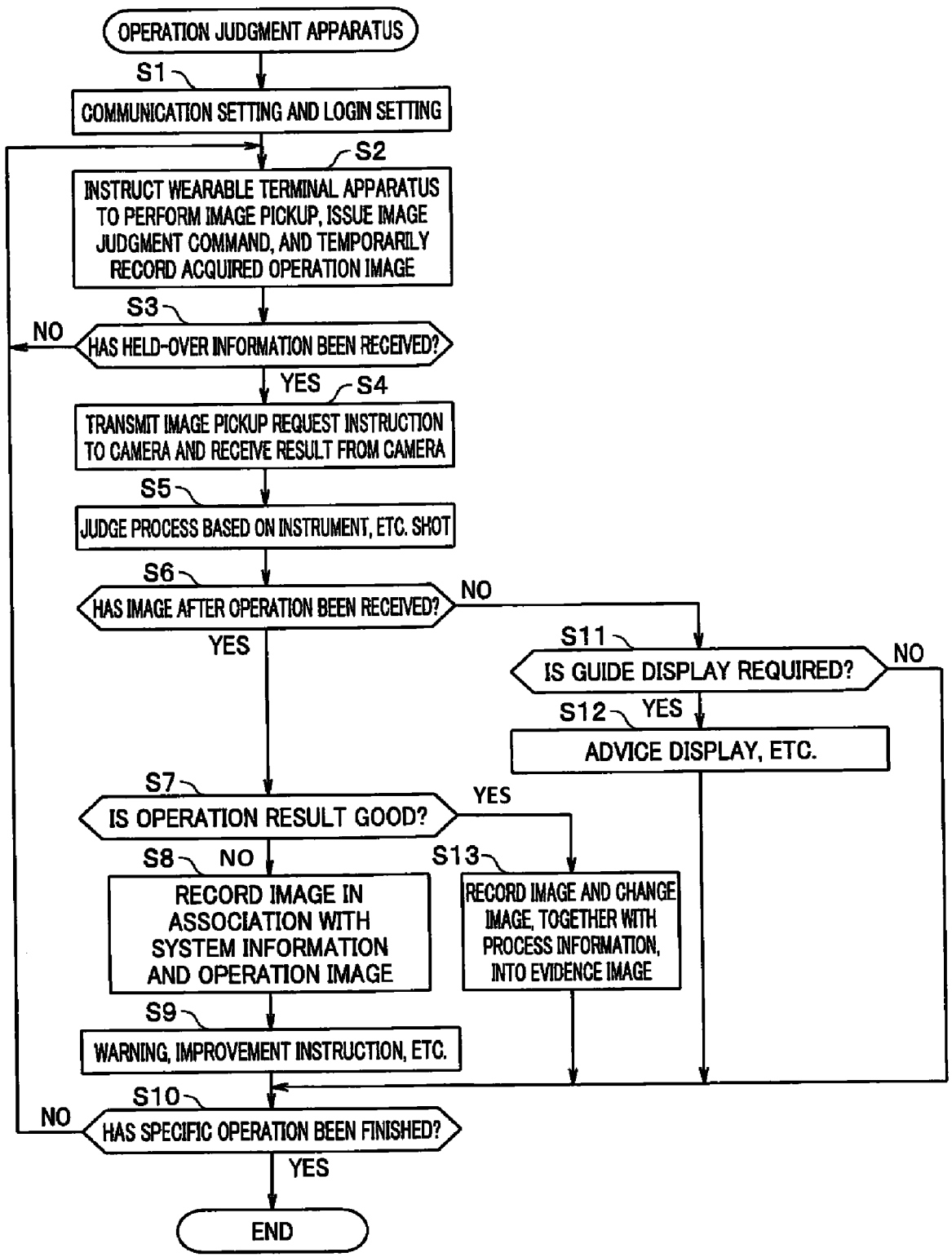
FIG. 9 is a flowchart for describing an operation according to the embodiment.
Figure 10:
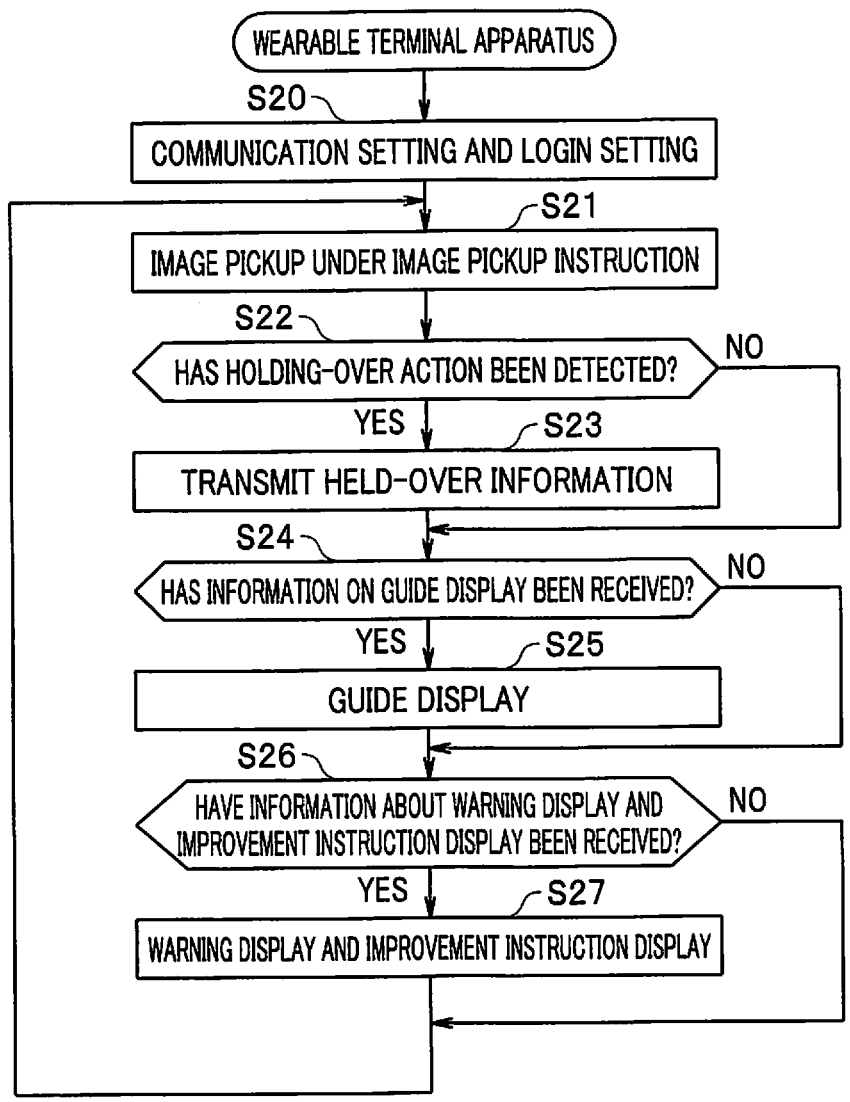
FIG. 10 is a flowchart for describing an operation according to the embodiment.
Figure 11:
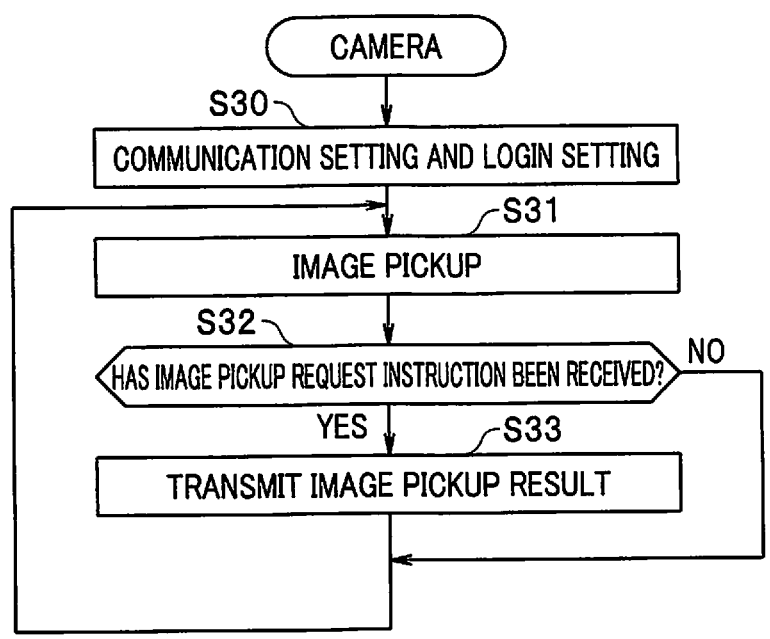
FIG. 11 is a flowchart for describing an operation according to the embodiment.

An operation in the embodiment thus configured will be described below with reference to FIGS. 4 to 15. FIG. 4 is a conceptual diagram illustrating how a predetermined maintenance operation (instrument washing and sterilization operation) is being performed using the operation support system according to the present embodiment. FIGS. 5A and 6A are explanatory diagrams respectively illustrating images Gb1 and Gb2 acquired by the wearable terminal apparatus 20, and FIGS. 5B and 6B are explanatory diagrams respectively illustrating images Gc1 and Gc2 acquired by the camera 30. FIGS. 7 and 8 are explanatory diagrams respectively illustrating contents of metadata of the images Gc1 and Gc2 illustrated in FIGS. 5B and 6B. FIGS. 9 to 11 are flowcharts each illustrating an operation in the present embodiment. FIGS. 12 to 15 are explanatory diagrams for each describing a configuration example of an image file.

Various types of operations in various types of fields can be assumed as an operation performed using the operation support system 1 illustrated in FIG. 1. However, in the following description, a maintenance operation relating to washing of a predetermined medical instrument, for example, among operations for handling medical instruments will be described as a specific example of the operation. More specifically, an operation for washing and sterilizing a surgical instrument, a treatment tool, or the like (an instrument having a shape of scissors; hereinafter abbreviated as scissors) as the medical instrument already used (hereinafter referred to as instrument washing and sterilization operation) will be illustrated as an example.

When a maintenance operation (instrument washing and sterilization operation) illustrated as an example in the present embodiment is performed, as illustrated in FIG. 4, the operator 100 performs the operation while sitting on a chair 151 at an operation table 150 installed within a predetermined operation room. At this time, the operator 100 remains wearing the wearable terminal apparatus 20 in the vicinity of the face. As a result, the wearable terminal apparatus 20 acquires image data (mainly movie data) in a predetermined region including the direction of the line of sight of the operator 100.

The camera 30 is placed while being oriented toward the operator 100 on the top of the operation table 150. The camera 30 acquires image data in a predetermined region including at least the vicinity of the hand of the operator 100. Note that the camera 30 desirably has a waterproof function in consideration of use under a water environment.

Illustration of the operation judgment apparatus 10 which cooperates with the wearable terminal apparatus 20 and the camera 30 is omitted in FIG. 4. The reason is that the operation judgment apparatus 10 is installed in a distant location because an operation location of an operation illustrated as an example in the present embodiment is in the vicinity of the water environment.

A maintenance operation (instrument washing and sterilization operation) illustrated as an example here is an operation for washing and sterilizing the scissors 200 as a surgical instrument or a treatment tool, for example, which is a medical instrument already used. Accordingly, the operation table 150 includes a washing tank 150a. Further, a faucet 153 is installed above the washing tank 150a. When a handle 153a in the faucet 153 is operated to rotate in an opening direction, running water 154 flows out of a running water port 153a.

The operator 100 brush-washes an instrument (the scissors 200) to be maintained in a washing liquid (e.g., water) stored in the washing tank 150a using a predetermined tool (a washing brush 300).

In this case, image data acquired by the wearable terminal apparatus 20 becomes the image Gb1, as illustrated in FIG. 5A, or the image Gb2, as illustrated in FIG. 6A, for example. The image Gb1 illustrated in FIG. 5A includes an image 200b1 of the scissors 200 gripped by the hand of the operator 100. The image Gb2 illustrated in FIG. 6A illustrates how the operator 100 is performing a brush-washing operation with an instrument to be maintained (the scissors 200) in one hand (a left hand 100L) and using a predetermined tool (a washing brush 300) in the other hand (a right hand 100R), and includes images 100Lg2 and 100Rg2 of the left and right hands, an image 200g2 of the scissors 200, and an image 300g2 of the brush 300.

In the operation support system 1, the wearable terminal apparatus 20 picks up respective images of situations of a plurality of operations sequentially performed by the operator, as needed. Each of image data thus acquired is transmitted to the operation judgment apparatus 10. The operation judgment apparatus 10 receives the image data acquired by the wearable terminal apparatus 20, and performs predetermined judgment processing based on the image data and various types of information previously stored in the database. For example, the operation judgment apparatus 10 judges a plurality of confirmation items defined depending on a content of an operation of interest, e.g., an instrument to be maintained, a type or the like of a used tool, and an operation action (brushing, washing with water, scraping, spraying with a medical agent, etc.), for example.

The operation judgment apparatus 10 performs various types of control processing based on a judgment processing result. For example, in a case of a result of judgment that a performed operation action matches a defined operation (is a correct operation), a confirmation check table is created, for example, and evidence recording is additionally performed. For example, the operation judgment apparatus 10 can cause the camera 30 to perform image pickup for evidence recording when the operator 100 holds the scissors 200 and the brush 300 in an image pickup range of the camera 30.

The operation judgment apparatus 10 instructs the camera 30 to pick up an image of the scissors 200 when the operation judgment apparatus 10 receives the image Gb1 illustrated in FIG. 5A, for example. FIG. 5B illustrates the image Gc1 obtained by the camera 30 performing image pickup in this case. The image Gc1 includes an image 200c1 of the scissors 200. The operation judgment apparatus 10 captures the image Gc1, and analyzes the image Gc1, to judge that an operation for washing the scissors 200 has been correctly performed.

FIG. 7 illustrates metadata to be added to the image Gc1. In this case, trigger output equipment is the apparatus B representing the wearable terminal apparatus 20, trigger judgment equipment is the apparatus A representing the operation judgment apparatus 10, shooting request equipment is the apparatus A, request destination equipment is the apparatus A, associated response equipment does not exist and is blank, a request condition is ΔT1 indicating that an image has been picked up within ΔT1 seconds since the wearable terminal apparatus 20 performed shooting, and a response image file name does not exist and is blank.

As the time ΔT1 designated by the request condition, a strictly specific time or time difference may be designated. Absolute time synchronization may be difficult while absolute strictness of a time may not be demanded depending on a performance and a use situation of equipment. The equipment may have a specification in which strictness can be defined under the request condition. Description is made here particularly by more emphasizing practical convenience than absolute strictness. That is, ΔT1 can also be written as an allowable time difference. If the allowable time difference is large, strictness is not so demanded. If the allowable time difference is small, strictness can also be handled as "is strict". If one second or less, for example, is designated by adopting the present embodiment, such a standard that pieces of equipment cooperate with one another based on such an interpretation that time alignment by referring to equipment synchronization, an absolute time, a Greenwich time, or the like in a significantly strict manner becomes important may be adopted. Conversely, a condition of the absolute time may be able to be designated. The designation can be performed if on apparatus, which can compare the respective clock errors of the pieces of equipment with the Greenwich Time or the like, may be used in cooperation. The time may be expressed in a term "reservation" in addition to a term "request condition". Equipment cooperation and content cooperation may be not always instantly performed right on the spot. There is also such a utilization method that pieces of equipment may be able to cooperate with one another later under a specific condition.

When the operation judgment apparatus 10 receives the image Gb2 illustrated in FIG. 6A, for example, the camera 30 is instructed to pick up an image of the scissors 200. FIG. 6B illustrates the image Gc2 obtained by the camera 30 performing image pickup. The image Gc2 includes an image 200c2 of the scissors 200 while also including an image 201c2 of dirt which has adhered to the scissors 200.

The operation judgment apparatus 10 captures the image Gc2, and analyzes the image Gc2, to obtain a result of judgment that a washing operation of the scissors 200 is deviated from a defined operation (an operation error has occurred). In this case, warning display indicating that the operation error has occurred, for example, is performed while guide display for restarting a correct operation, for example, is performed. Further, the camera 30 is instructed to update metadata.

FIG. 8 illustrates metadata added to the image Gc2. As illustrated in FIG. 8, trigger output equipment is the apparatus B representing the wearable terminal apparatus 20, trigger judgment equipment is the apparatus A representing the operation judgment apparatus 10, shooting request equipment is the apparatus A, request destination equipment is the apparatus A, associated response equipment is the apparatus B, a request condition is −ΔT2 indicating that an image has been picked up within −ΔT2 seconds since the camera 30 picked up the image Gc2, and a response image file name represents the image Gb2.

The metadata added to the image Gc2 indicates that the image Gb2 represented by the response image file name picked up by the wearable terminal apparatus 20 as the apparatus B is designated as a cooperation image before ΔT2 seconds since the image Gc2 was picked up.

The metadata illustrated in FIG. 7 indicates that the image Gc1 is an evidence image representing an operation success shot after ΔT1 seconds since the wearable terminal apparatus 20 performed image pickup. On the other hand, the metadata illustrated in FIG. 8 indicates that the image Gc2 represents an operation failure and an image picked up by the wearable terminal apparatus 20 before ΔT2 seconds since the image was picked up is the image Gb2.

A function in performing a predetermined maintenance operation (instrument washing and sterilization operation) using the operation support system 1 will be described below with reference to flowcharts illustrated in FIGS. 9 to 11.

FIG. 9 is a flowchart illustrating a function of the operation judgment apparatus 10. Although a server, a personal computer, or the like configured to govern a system in an institution is assumed, such a function may be replaced with the wearable terminal apparatus 20 and the camera 30 in a smaller-scaled system. In this case, a system can be configured by only the wearable terminal apparatus 20 and the camera 30 without including the operation judgment apparatus 10 itself. Particularly if such operation support is provided in an outdoor field, for example, the camera 30 can be replaced with an information terminal with camera. FIG. 10 is a flowchart illustrating a function of the wearable terminal apparatus 20. FIG. 11 is a flowchart illustrating a function of the camera 30.

In the operation support system 1, each of the apparatuses (the operation judgment apparatus 10, the wearable terminal apparatus 20, and the camera 30) is brought into a power-on state. In this state, the operator 100 starts a predetermined operation under a predetermined environment illustrated in FIG. 4. The predetermined operation described here illustrates as an example a "scissors washing and sterilization operation" among maintenance operations of medical instruments.

First, the operation judgment apparatus 10, the wearable terminal apparatus 20, and the camera 30 respectively perform communication setting and login setting to establish mutual communication in steps S1, S20, and S30. As a result, communication between the operation judgment apparatus 10 and the wearable terminal apparatus 20 and communication between the operation judgment apparatus 10 and the camera 30 are established.

The operation judgment apparatus 10 instructs the wearable terminal apparatus 20 to perform image pickup in the power-on state, issues an image judgment command, and temporarily records an acquired operation image (step S2). The wearable terminal apparatus 20 is performing an operation for picking up a live view image in the power-on state, and is in an instruction signal waiting state (step S21 illustrated in FIG. 10). Similarly, the camera 30 is also performing an operation for picking up a live view image in the power-on state, and is in an instruction signal waiting state (step S31 illustrated in FIG. 11).

In this state, the operator 100 starts a predetermined "scissors washing and sterilization operation" in a predetermined operation location. First, the operator 100 performs an action for holding an instrument (the scissors 200) to be maintained in the "scissors washing and sterilization operation" over a front surface (within an image pickup range) of the camera 30 with the instrument in hand.

Then, the wearable terminal apparatus 20 detects whether or not the action (the action for holding the scissors 200 over the front surface of the camera 30; hereinafter abbreviated as "holding-over action") has been performed (step S22 illustrated in FIG. 10). The detection processing is performed in the image judgment unit 21a in the control unit 21 in the wearable terminal apparatus 20, for example. If the "holding-over action" for the instrument has been detected, the processing proceeds to step S23 illustrated in FIG. 10. If the "holding-over action" for the instrument has not been detected, the detection processing is continuously repeated.

In step S23 illustrated in FIG. 10, the control unit 21 in the wearable terminal apparatus 20 transmits information indicating that the "holding-over action" for the instrument has been performed (hereinafter abbreviated as "held-over information") to the operation judgment apparatus 10. Then, the wearable terminal apparatus 20 remains in the waiting state until information about guide display is received (step S24) and until information about a warning and an improvement instruction are received (step S26) while performing the operation for picking up the live view image in step S21.

The operation judgment apparatus 10 in a waiting state confirms whether or not the "held-over information" for the instrument has been received in step S3 illustrated in FIG. 9. If the receiving of the "held-over information" for the instrument has been confirmed, the processing proceeds to subsequent step S4. Note that if the receiving of the information has not been confirmed, the operation judgment apparatus 10 continuously waits for receiving of an instruction signal.

In step S4, the control unit 11 in the operation judgment apparatus 10 transmits an instruction to request to perform a predetermined image pickup operation (an image pickup request instruction) to the camera 30. Then, the operation judgment apparatus 10 waits until an image pickup result (image data of the scissors 200, etc.) is transmitted from the camera 30.

The camera 30 confirms whether or not the image pickup request instruction from the operation judgment apparatus 10 has been received in step S32 illustrated in FIG. 11. If the receiving of the image pickup request instruction has been confirmed, the camera 30 performs a predetermined image pickup operation, and the processing then proceeds to subsequent step S33. Note that, image data acquired by the image pickup operation performed here is image data of an ambient environment (e.g., an operation room or an operation table) including the operator 100 himself/herself, for example, in addition to enlarged image data of the scissors 200, for example. It can be confirmed whether or not the operation has been performed under a correct (defined) operation environment or whether or not the operator 100 wears a correct (defined) brace, specifically, a mask, gloves, or a face protector, for example, by acquiring ambient environmental data.

Then, in step S33, information such as image data (mainly still image data) acquired as a result of the image pickup operation is transmitted to the operation judgment apparatus 10. Then, the processing returns to step S31. In step S31, the camera 30 waits for receiving of a predetermined instruction signal while continuously performing the operation for picking up the live view image.

The operation judgment apparatus 10 receives an image pickup result (image data of the scissors 200) by the camera 30 (step S4 illustrated in FIG. 9). If the operation judgment apparatus 10 receives the image pickup result from the camera 30, the processing proceeds to subsequent step S5. In step S5, the operation judgment apparatus 10 controls the target judgment unit 11d in the control unit 11 or the like, to perform processing for judging an instrument to be maintained. The judgment processing is processing performed by referring to the image pickup result (the image data of the scissors 200) received in step S4, image data of the instrument to be maintained stored in the database 13, and the like.

Then, the operation judgment apparatus 10 judges whether or not an image after completion of an operation in a predetermined process has been received in step S6. If the image after completion of the operation has not been received, the operation judgment apparatus 10 judges whether or not guide display is required in step S11. If the guide display is required, the operation judgment apparatus 10 causes the wearable terminal apparatus 20 to perform advice display in step S12. Note that, if the operation judgment apparatus 10 judges that the guide display is not required, the processing proceeds from step S11 to step S10. In step S10, the operation judgment apparatus 10 judges whether or not a specific operation has been finished.

If the operation judgment apparatus 10 judges that the image after completion of the operation has been received in step S6, the processing proceeds to step S7. In step S7, the operation judgment apparatus 10 compares movie data received from the wearable terminal apparatus 20 with correspondence data stored in the database 13. Then the operation judgment apparatus 10 confirms whether or not an operation performed by the operator 100 is a correct (defined) operation based on the acquired movie data.

If there is no problem in a result of the comparison, i.e., if the operation judgment apparatus 10 confirms that an operation (an acquired movie) performed by the operator 100 is a correct (defined) operation (the operation is OK), the processing proceeds to subsequent step S13. If the operation is not OK, the processing proceeds to step S8.

If the operation judgment apparatus 10 judges that an operation result is good, the operation judgment apparatus 10 records an image in step S13, to change the image, together with process information, into an evidence image. That is, the operation judgment apparatus 10 causes the recording control unit 11e to record image data and metadata in the recording unit 14. Although an example in which image data and metadata are respectively recorded in different regions of the recording unit 14 is illustrated in FIG. 1, the image data and the metadata are generally filed and recorded as one image file.

Figure 12:
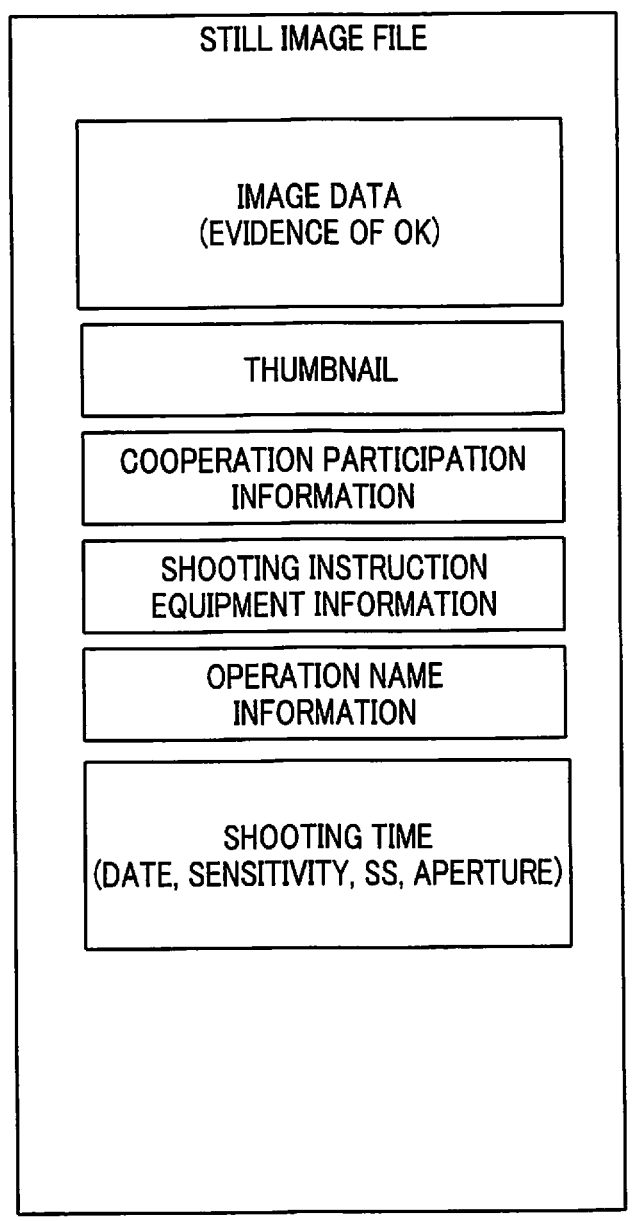
FIG. 12 is an explanatory diagram for describing a configuration example of an image file.

FIG. 12 illustrates an image file recorded in the recording unit 14 in this case. The image file illustrated in FIG. 12 includes image data of evidence indicating that an operation is good (is OK). Further, the image file illustrated in FIG. 12 includes, as metadata, a thumbnail, cooperation participation information, shooting instruction equipment information, operation name information, a date and time, sensitivity, a shutter speed (SS), and an aperture of the image data which is shooting time information.

On the other hand, if the operation judgment apparatus 10 judges that the operation result is not good, then in step S8, the operation judgment apparatus 10 records an image acquired by the camera 30 in association with system information and an operation image from the wearable terminal apparatus 20. That is, the operation judgment apparatus 10 updates the metadata to designate an image picked up by the wearable terminal apparatus 20 as a cooperation image, as described above, keeping a record indicating that an operation error has occurred. Then, the operation judgment apparatus 10 issues a warning and an improvement instruction, for example, in step S9.

Figure 13:
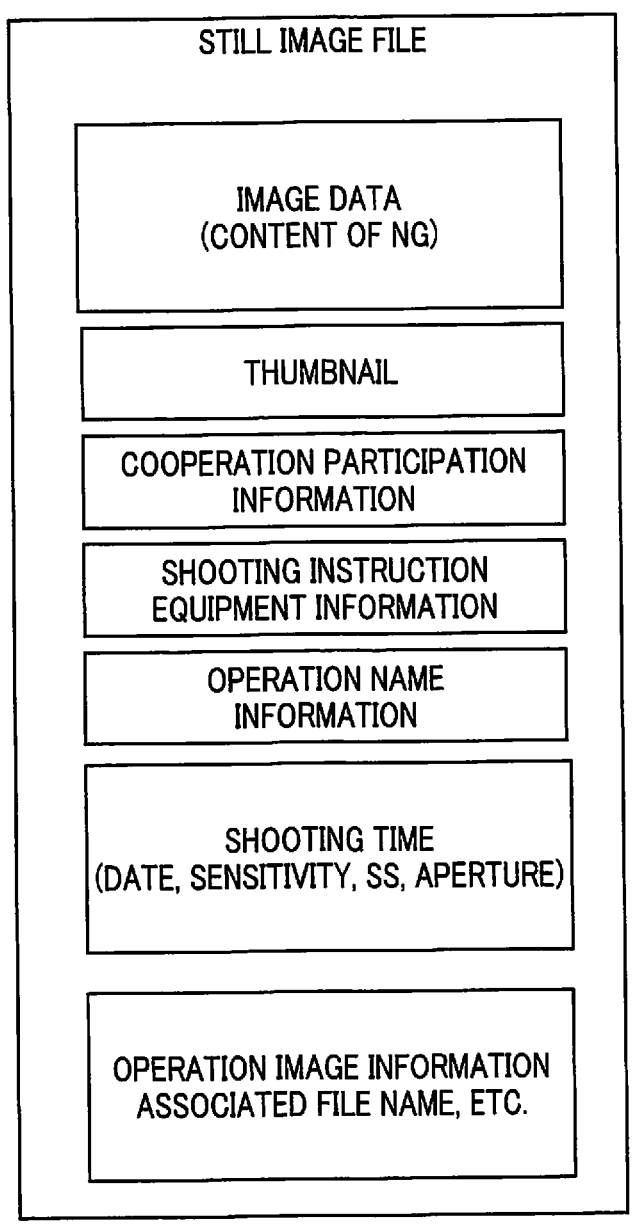
FIG. 13 is an explanatory diagram for describing a configuration example of an image file.

FIG. 13 illustrates an image file recorded in the recording unit 14 in this case. The image file illustrated in FIG. 13 includes image data indicating that an operation is not good (is NG). Further, the image file illustrated in FIG. 13 includes, as metadata, a thumbnail or the image data, cooperation participation information, shooting instruction equipment information, operation name information, a date and time, sensitivity, a shutter speed (SS), and an aperture, which is shooting time information and operation image information of the image data. Note that the operation image information corresponds to the response image Gb2 in the example illustrated in FIG. 8.

In steps S24 and S26 illustrated in FIG. 10, the wearable terminal apparatus 20 confirms whether or not the information about warning display, guide display, improvement instruction display, and the like have been received. If the receiving of the information has been confirmed, the processing proceeds to subsequent steps S25 and S27. If the receiving of the information has not been confirmed, the processing returns to step S21, described above. In step S21, the wearable terminal apparatus 20 enters a waiting state while performing the live view image pickup operation. In steps S25 and S27, the control unit 21 in the wearable terminal apparatus 20 controls the display unit 25, to perform warning display, guide display, improvement instruction display, and the like having a predetermined form.

On the other hand, the operation judgment apparatus 10 confirms whether or not the process has ended in step S10. The confirmation is performed by referring to the database 13, for example. If the operation judgment apparatus 10 does not confirm that the process has ended, i.e., if the process has not ended and a subsequent operation exists, the processing returns to step S2.

Thus, in the present embodiment, if a plurality of pieces of equipment perform image pickup in cooperation, or if images respectively obtained by the plurality of pieces of equipment performing shooting are cooperatively used, cooperation participation information is added to the picked-up images. As a result, each of the picked-up images enables grasping as to whether or not supply of a cooperation image has been requested based on the picked-up image, whether or not the picked-up image is a cooperation image which can be supplied to correspond to a cooperation source image, information such as a supply source or a supply destination of the cooperation image, or a cooperation condition, for example. As a result, even if the plurality of pieces of equipment perform cooperative shooting or if the cooperative shooting has been performed according to a management apparatus, various types of information about cooperation can be acquired from only an image file, and the picked-up images respectively obtained by the plurality of pieces of equipment can be cooperatively used. Thus, in the present embodiment, effective use of an image can be significantly promoted.

Although the cooperation participation information illustrated in FIGS. 12 and 13 each include the above-described request information and provision information, the above-described cooperation participation information is an example. Cooperation participation information illustrated in FIGS. 14 and 15 may be each recorded as metadata in place of some or all of the above-described request information and provision information or in addition to some or all of the above-described request information and provision information as the cooperation participation information.

The cooperation participation information illustrated in FIG. 14 includes information indicating that equipment which has picked up a picked-up image (hereinafter referred to as the equipment) is an image pickup subject, information indicating that equipment other than the equipment is an image pickup subject, information indicating that the number of pieces of equipment other than the equipment is plural, and information indicating that control equipment configured to control the plurality of pieces of equipment exists.

The cooperation participation information illustrated in FIG. 15 includes information indicating that an image of the equipment is not cooperative but independent by a circle mark (independent), information indicating that the equipment is in an equal cooperative relationship with other equipment cooperating with the equipment by circle marks (equal cooperation), information indicating that the equipment is in a master relationship with other equipment cooperating with the equipment by a circle mark and a triangle mark, respectively, as a master and a slave (a master-slave cooperation 1), and information indicating that the equipment is in a slave relationship with other equipment cooperating with the equipment by a circle mark and a triangle mark, respectively, as a master and a slave (master-slave cooperation 2).

As described above, even if it is ascertained that provision equipment having provision information exists for request equipment configured to request to supply a cooperation image using request information, image data of the cooperation image need not be transferred to the request equipment immediately after the ascertainment, and only an image file name, for example, for specifying the cooperation image may be transmitted. In this case, when the request equipment can access the provision equipment via a predetermined network, if necessary, the cooperation image can be acquired.

If the provision equipment uploads the cooperation image to the predetermined network, the request equipment can also acquire the cooperation image by accessing the predetermined network. That is, in the present embodiment, a system in which a plurality of pieces of equipment create a content in cooperation can be configured. That is, to create a cooperation content created by a plurality of pieces of equipment in cooperation, each of the pieces of equipment includes a content creation circuit configured by an image pickup unit, for example. The pieces of equipment respectively include processors, and each of the processors gives a relationship among contents constituting the cooperation content as metadata to each of the contents. Further, the processor can configure a content creation system configured to create the cooperation content by generating information about the plurality of pieces of equipment as parties to the cooperation and request source information about a request source which has outputted a cooperation condition as the metadata.

Furthermore, the provision equipment can also record the provision information as metadata without knowing existence of the request equipment. In this case, when the provision equipment uploads an image describing a request condition to a public network, for example, the uploaded image can also be downloaded as a cooperation image in the request equipment which has made a request corresponding to a content of the request condition. Examples of the request condition can include a network environment, a location, a shooting time, and an image pickup direction. When an image including provision information describing in a request condition an image having been shot on a predetermined date and in a time zone at a predetermined location is uploaded to a public server, the request equipment can also download an image associated with images respectively obtained by shooting at the same time and at the same location, for example, at a later date from the public server. In this case, request destination equipment in the request information may include information about a URL of the public server.

Note that, although equipment configured to participate in cooperation has been described as transmitting the cooperation participation information, an image file itself including the cooperation participation information may be transmitted. The request equipment can acquire a cooperation image using an image file name of the cooperation image, for example. However, in this case, a transferred cooperation image may be recorded, or may be displayed without being recorded. Although an example of the still image has been described as the cooperation image, the cooperation image may be a movie.

Second Embodiment

Figure 16:
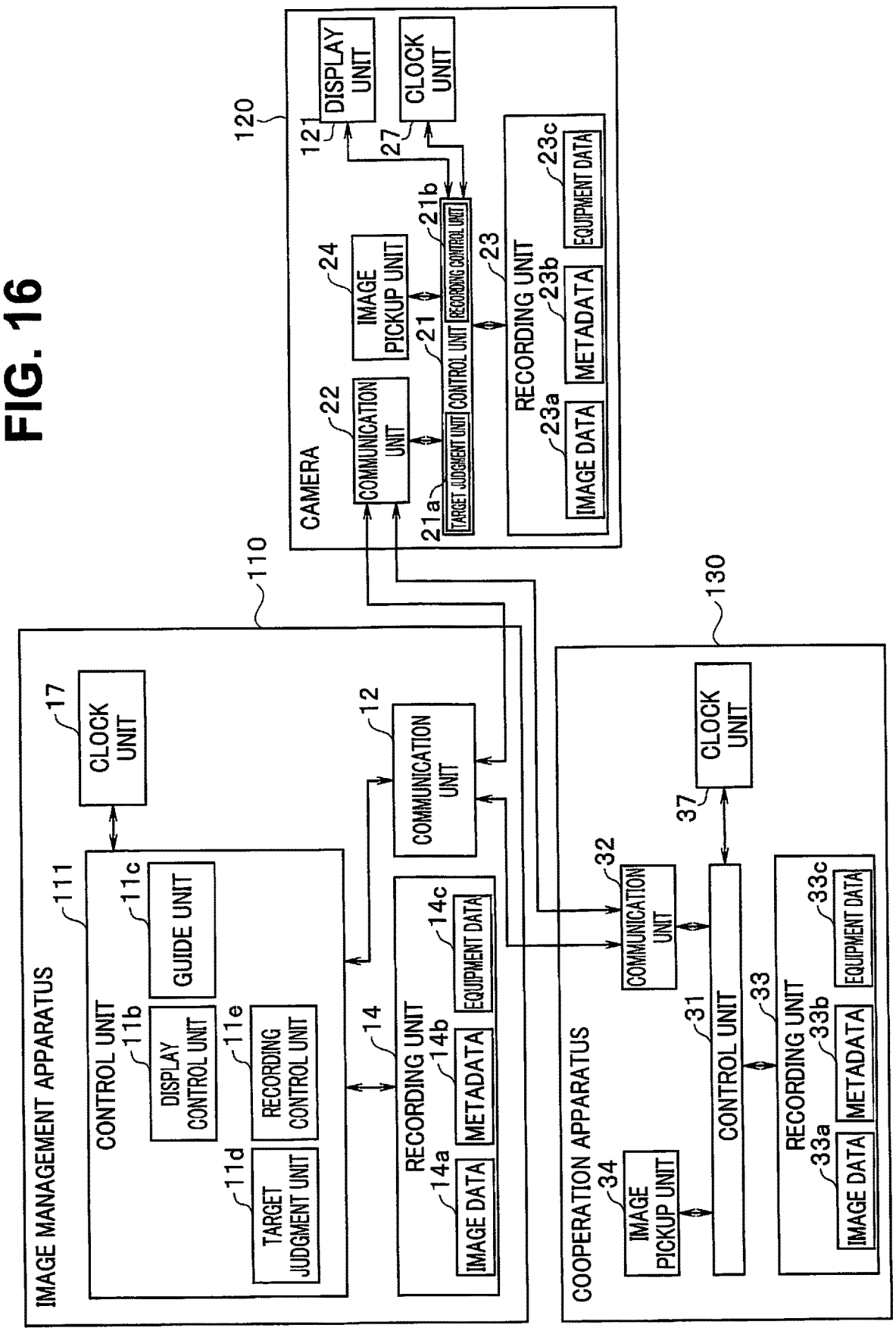
FIG. 16 is a block diagram illustrating a second embodiment of the present invention.

FIG. 16 is a block diagram illustrating a second embodiment of the present invention. Similar components to the components illustrated in FIG. 1 are assigned the same reference numerals in FIG. 16, and description of the components is omitted. The present embodiment only differs from the first embodiment in specific application examples, and can be implemented by a similar configuration to the configuration in the first embodiment.

That is, the configuration in the present embodiment is substantially similar to the configuration illustrated in FIG. 1. In an image management apparatus 110, a control unit 111 is adopted in place of the control unit 11 in the operation judgment apparatus 10 illustrated in FIG. 1 while the database 13 is deleted. The control unit 111 differs from the control unit 11 in that the operation judgment unit 11*a* is omitted. A camera 120 differs from the wearable terminal apparatus 20 illustrated in FIG. 1 in that the warning unit 26 is omitted while a display unit 121 is adopted in place of the display unit 25. A cooperation apparatus 130 has a similar configuration to the configuration of the camera 30 illustrated in FIG. 1.

Figure 17:
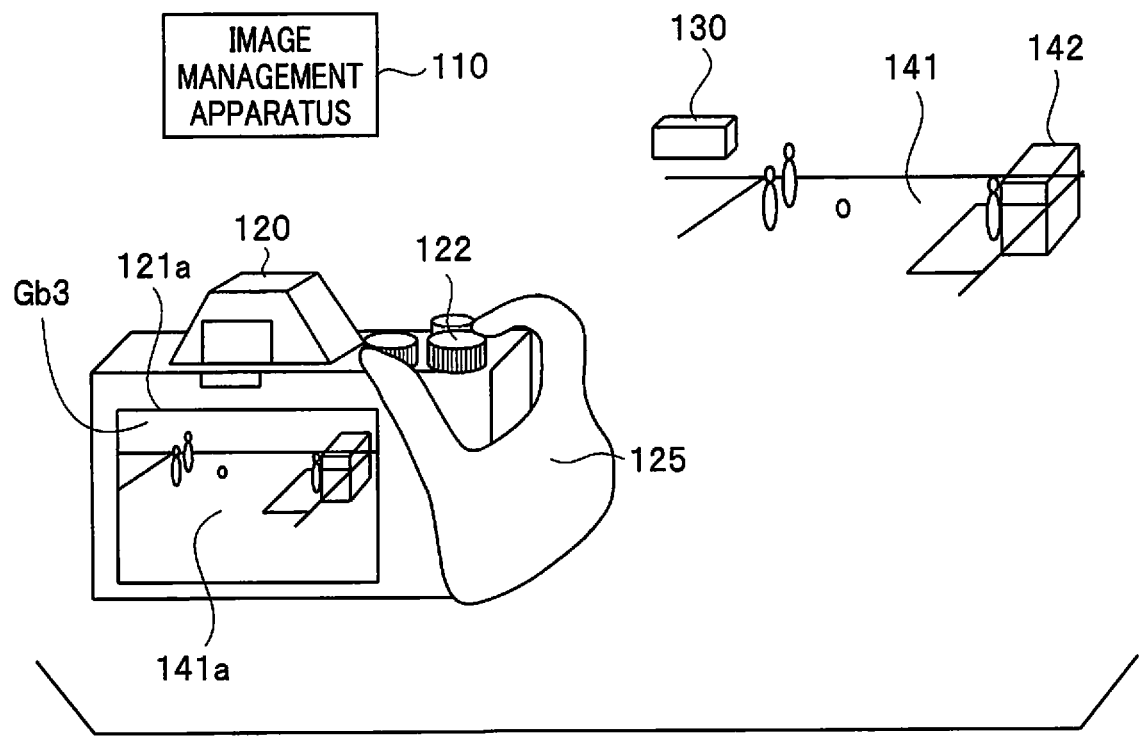
FIG. 17 is an explanatory diagram for describing equipment cooperation in a soccer game.
Figure 18:
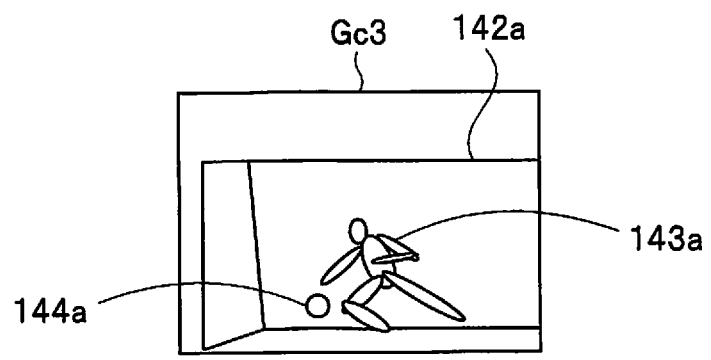
FIG. 18 is an explanatory diagram for describing equipment cooperation in a soccer game.
Figure 19:
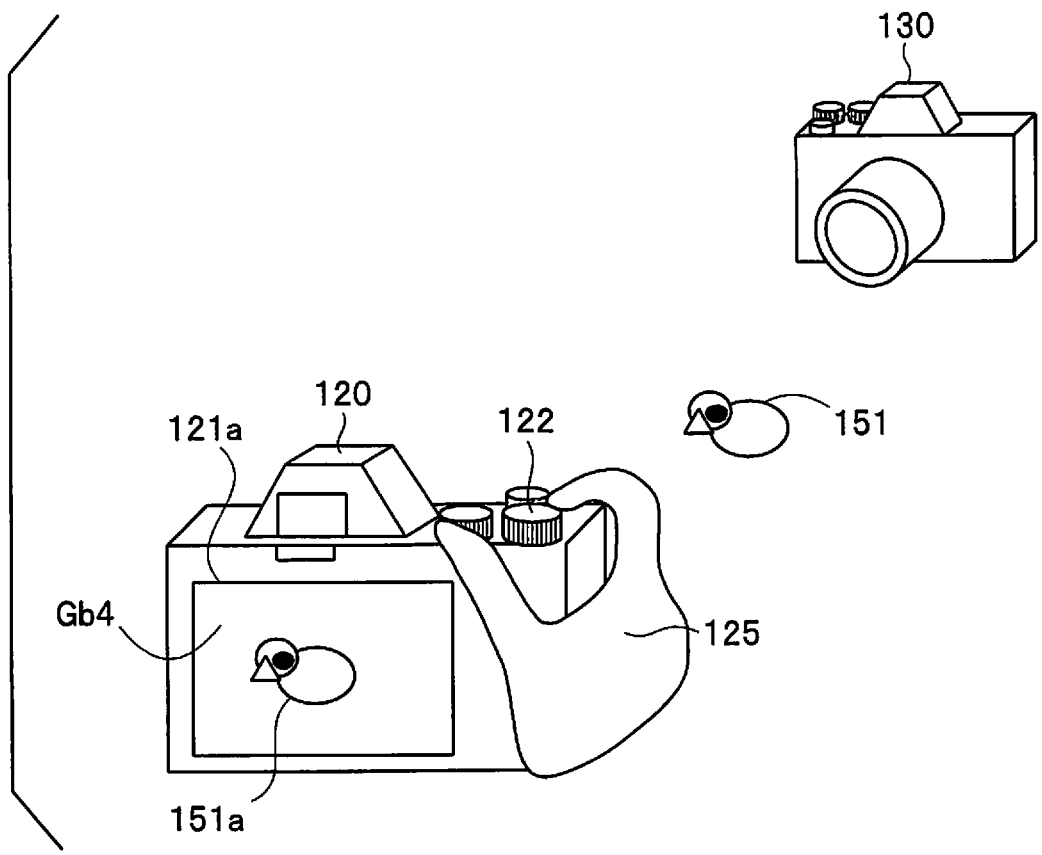
FIG. 19 is an explanatory diagram for describing equipment cooperation in three-dimensional shooting.
Figure 20:
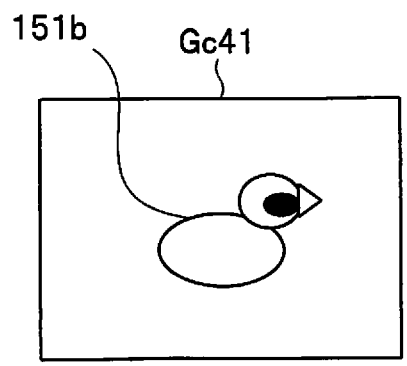
FIG. 20 is an explanatory diagram for describing equipment cooperation in three-dimensional shooting.
Figure 21A:
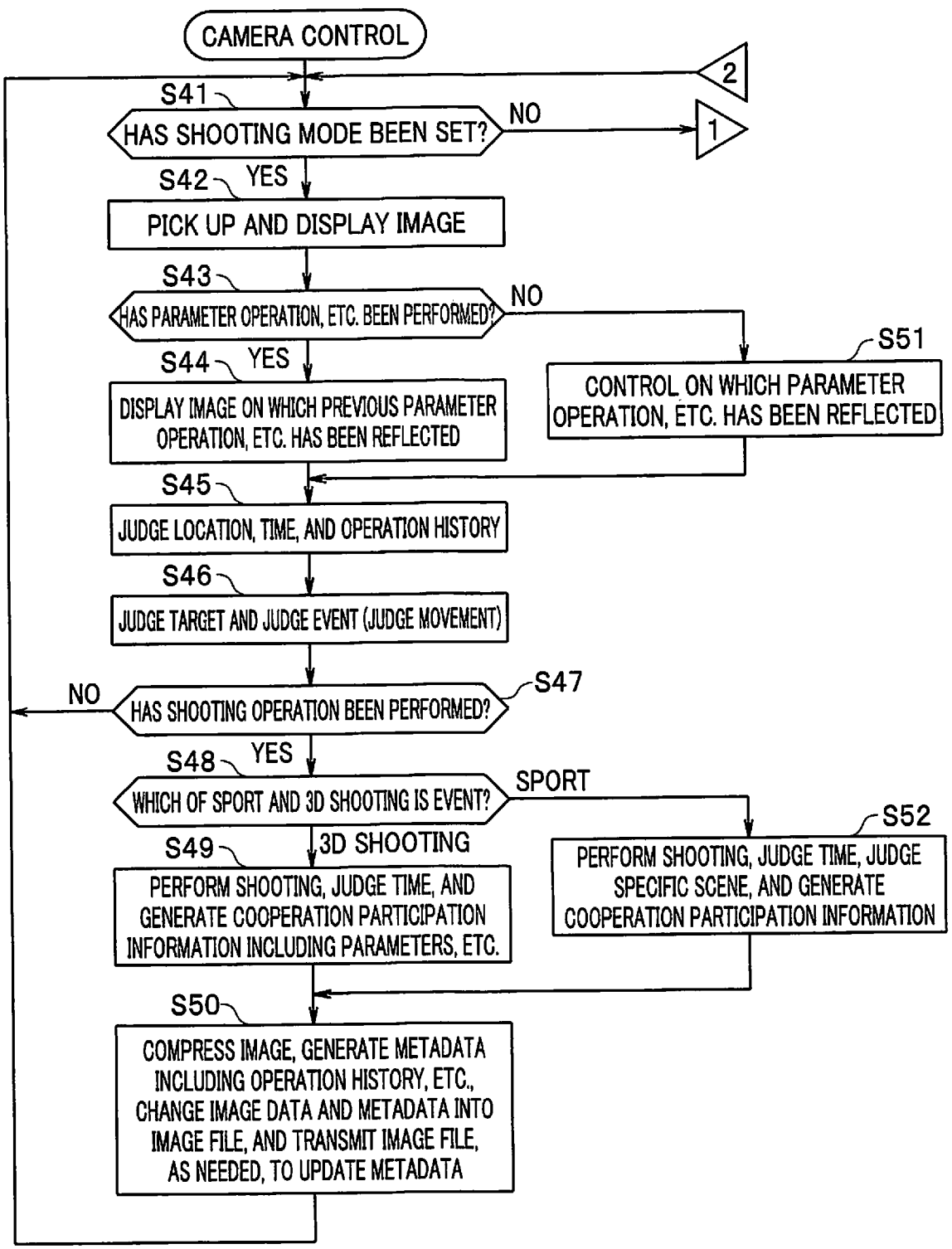
FIG. 21A is a flowchart illustrating camera control of a camera 120.
Figure 21B:
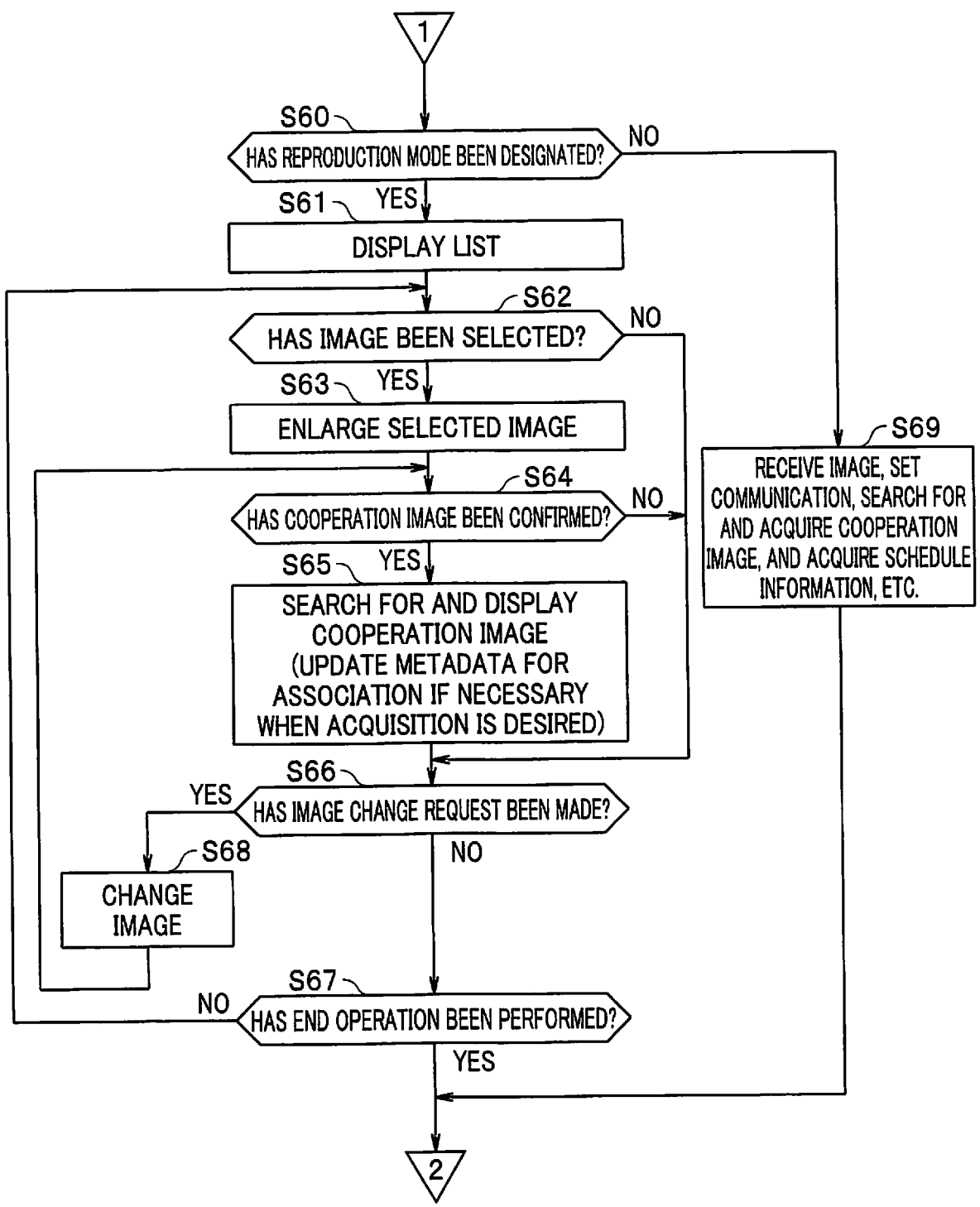
FIG. 21B is a flowchart illustrating camera control of the camera 120.
Figure 22:
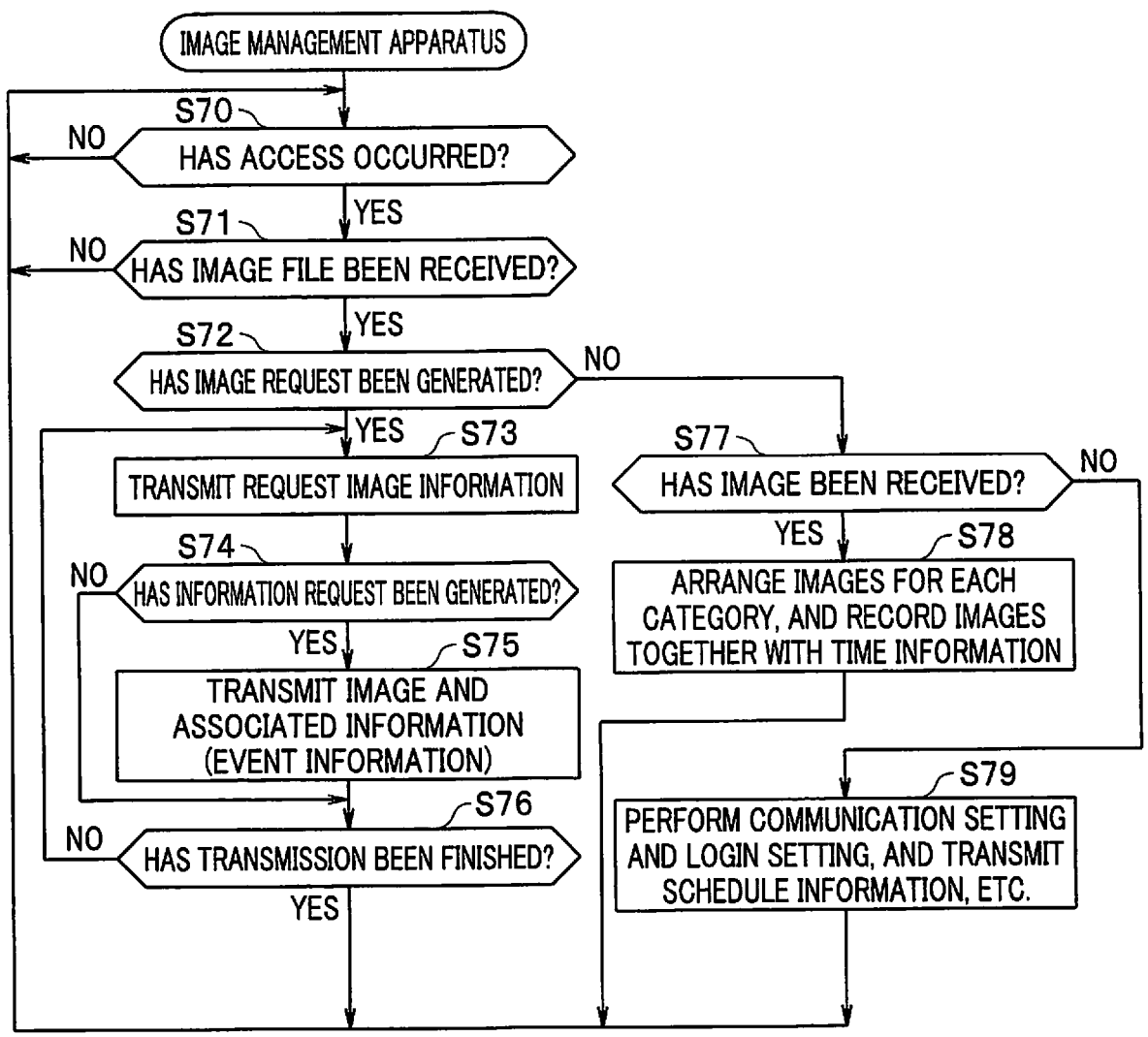
FIG. 22 is a flowchart illustrating an operation of an image management apparatus 110.

A function in the embodiment thus configured will be described below with reference to FIGS. 17 to 26. FIGS. 17 and 18 are explanatory diagrams for each describing equipment cooperation in a soccer game. FIGS. 19 and 20 are explanatory diagrams for each describing equipment cooperation in three-dimensional shooting. FIGS. 21A and 21B are flowcharts each illustrating camera control of the camera 120. Note that FIGS. 21A and 21B indicate that steps are connected to each other by the same numerals each surrounded by a triangle. FIG. 22 is a flowchart illustrating an operation of the image management apparatus 110. FIGS. 23 and 24 are explanatory diagrams each illustrating metadata of the camera 120 corresponding to FIG. 17 or 20.

FIG. 17 illustrates how a soccer game is shot by the camera 120 and the cooperation apparatus 130. In a soccer game in the ground 141, one of spectators shoots the side of a goal 142 in the ground 141 using the camera 120 from a spectator stand, for example. The spectator performs a shooting operation while seeing a through image displayed on a display screen 121*a* in the display unit 121. The spectator operates a shutter button of the camera 120 with his/her right hand 125 to perform image pickup, to pick up an image Gb3 displayed on the display screen 121*a*. An image 141*a* in a relatively wide region of the ground 141 has been picked up within the image Gb3.

On the other hand, the image management apparatus 110 manages an image from the cooperation apparatus 130 as a broadcasting camera installed in a soccer field, for example. The cooperation apparatus 130 is of a stationary type attached to a tripod or the like, has a telescopic function, for example, and can acquire a wide-angle image. A plurality of cooperation apparatuses 130 may perform shooting in cooperation under management of the image management apparatus 110. FIG. 18 illustrates a picked-up image Gc3 of the cooperation apparatus 130, and includes an image 142*a* of a goal 142 and respective images 143*a* and 144*a* of a keeper who is trying to catch a ball and the ball caught by the keeper.

In an example illustrated in FIGS. 17 and 18, the image Gb3 acquired using the camera 120 by the spectator is an image which captures a state of movement of a player immediately before a free kick, the image Gc3 acquired by the cooperation apparatus 130 as a broadcasting camera captures a situation in the vicinity of the goal 142 immediately after the free kick. Generally, it can be said that the image Gc3 captures a scene which easily interests a user. In the present embodiment, the spectator who performs shooting using the camera 120 can acquire an image of a better scene or obtain a easily memorable image by requesting an image acquired by the image management apparatus 110 as a cooperation image.

For example, the spectator may transmit cooperation participation information including an image file or request information in the image file to the image management apparatus 110 after shooting the image Gc3 by operating the camera 120. If the image management apparatus 110 uploads an image acquired from the cooperation apparatus 130 to a public server (not illustrated), the spectator can also request to provide the image Gc3 by uploading an image file stored in the camera 120 or cooperation participation information including request information in the image file to the public server after watching a soccer game, for example.

Although an example in which the spectator desires the broadcasting camera 130 to supply an image is illustrated in FIGS. 17 and 18, the spectator can desire to request an image shot by the camera 120 in the image management apparatus 110. If an image may be supplied among spectators who have visited a soccer field, for example, a picked-up image may be uploaded by including supply information in cooperation participation information in the picked-up image.

A control unit 21 in the camera 120 judges whether or not a shooting mode has been set in step S41 illustrated in FIG. 21A. If the shooting mode has been set, then in subsequent step S42, the control unit 21 starts image pickup, to display a through image on the display screen 121*a* of the display unit 121. The control unit 21 judges whether or not the user has performed an operation for changing a shooting parameter (step S43). If the changing operation has been performed, then in step S51, the control unit 21 performs control on which setting of a parameter operation or the like has been reflected, to perform image pickup. If the changing operation has not been performed, then in step S44, the control unit 21 performs image pickup corresponding to a previous parameter operation or the like. A picked-up image on which a setting operation by the user has been reflected is displayed on the display screen 121*a*. In step S45, the control unit 21 judges a shooting position (location), a time, an operation history, and the like to be recorded as metadata of an image file.

In step S46, the control unit 21 then judges a target from the picked-up image while judging movement, for example, to judge with which event the picked-up image is associated. For example, an image in which movement of a person is relatively large may be judged to have been obtained by shooting a sporting event. If the target is an object with no movement, for example, the picked-up image may be judged to be an image relating to 3D shooting.

The control unit 21 judges whether or not a shooting operation has been performed in step S47. If the control unit 21 judges that the shooting operation has not been performed, the processing returns to step S41. If the control unit 21 judges that the shooting operation has been performed, the processing proceeds to step S48. In step S48, the control unit 21 judges which of a sporting event and a 3D shooting event the event is in step S46.

Although description has been made here by taking an example in which a condition under which pieces of equipment are to cooperate with one another (a cooperation condition) is significantly different, the present invention does not naturally assume only such a branch. Even in a sport scene, a deformed shape of a ball which has hit a bat may be desired to be simultaneously shot from various angles. However, in such a case, the user may manually input the desire. The judgment may be made settable not automatically but manually, to make a branch in step S48 changeable depending on a result of the judgment. There is also a need to increase synchronization and cooperation accuracies as movement increases based on a movement judgment result. In observation of various physical phenomena, for example, matching at an absolute time in shooting and observation of a moving target may be demanded.

In a case of the sporting event, the control unit 21 performs shooting, and then judges a time and judges a specific scene for the shooting, to generate request information in step S52. In subsequent step S50, the control unit 21 compresses a picked-up image, generates metadata together with an operation history or the like, and files image data and the metadata. The control unit 21 further transmits an image file or cooperation participation information in the image file, if necessary.

At this time (at the time of the shooting), equipment only desires to refer to information about other equipment unless the equipment immediately cooperates with the other equipment. Therefore, the pieces of equipment need not always quickly cooperate with one another. The cooperation condition becomes a cooperation request, a request condition, or a cooperation condition also including "reservation" rather than such "immediacy". The request condition or the cooperation condition including "immediacy" and "reservation" also becomes metadata. Such a device prevents control of the other equipment from being unnecessarily interfered with, thereby improving practicality. The equipment also becomes an inconvenient apparatus because a large restriction occurs in user's convenience if a cooperation request having neither urgency nor immediacy is urgently issued from the other equipment.

In step S70 illustrated in FIG. 22, the control unit 111 in the image management apparatus 110 monitors access from the other equipment. If the access occurs, then in step S71, the control unit 111 judges whether or not the image file or the cooperation participation information in the image file has been received. If the control unit 111 judges that neither the image file nor the cooperation participation information in the image file has been received, the processing is returned to step S70. If the control unit 111 judges that the image file or the cooperation participation information in the image file has been received, then in subsequent step S72, the control unit 111 judges whether or not an image request based on request information has been generated. If the control unit 111 judges that the image request has not been generated, then in subsequent step S77, the control unit 111 judges whether or not an image has been received from the managed cooperation apparatus 130 or the camera 120 operated by the spectator.

If the control unit 111 judges that the image has not been received, then in subsequent step S79, the control unit 111 performs communication setting and login setting, to transmit schedule information or the like to the cooperation apparatus 130. The cooperation apparatus 130 performs shooting in response to the schedule information, and transmits a picked-up image to the image management apparatus 110.

If the control unit 111 receives images from the cooperation apparatus 130 or the camera 120, the processing proceeds from step S77 to S78. In step S78, the control unit 111 arranges the received images for each category, and records the arranged images together with time information. If images of a soccer game are recorded, for example, the images are divided into categories, i.e., a scene in a first half, a scene in a second half, a shoot scene, a foul scene, a scene in a half time, and other scenes. As a result, request equipment describes the categories in request information so that the image of the desired scene can be provided to the request equipment. In the image management apparatus 110, the image, which is considered to be effective in the predetermined scene, can be easily searched for, and can also be used when broadcast.

If the control unit 111 judges that the image request has been generated in step S72, then in subsequent step S73, the control unit 111 transmits requested image information. The image information in this case is image information about a cooperation image. The control unit 21 in the camera 120 updates, when it acquires information about a cooperation image from the image management apparatus 110 as request destination equipment, metadata based on the acquired information in step S50.

For example, the control unit 21 may not only additionally write an image file name of a cooperation image based on the received information but also update information about the request destination equipment, the request condition, or the like. If a cooperation image is stored in request destination equipment different from the initial request destination equipment, for example, the control unit 21 updates the request destination equipment and the request condition, for example, in response to information required to download the cooperation image.

FIG. 23 illustrates metadata of the camera 120 as request equipment. In an example illustrated in FIG. 23, trigger output equipment is an apparatus B representing the camera 120 as its own equipment, trigger judgment equipment is the apparatus B representing the own equipment, and shooting request equipment is also the apparatus B. In this case, information about the pieces of equipment may be omitted. In the example illustrated in FIG. 23, request destination equipment is an apparatus A representing the image management apparatus 110, associated response equipment is an apparatus C representing the cooperation apparatus 130 which has shot a shoot scene, a request condition is ΔT3 indicating that an image has been shot within ΔT3 seconds since the camera 120 picked up the image Gb3, and a response image file name is the image Gc3 of the shoot scene.

Note that when a sport is shot, a relatively long time period, e.g., approximately 10 seconds may be set as the request condition ΔT3. Note that if the image Gc3 uploaded to a public server at home, for example, after a soccer game is watched is desired to be provided, examples of a request condition can include information about the public server, information about an ID and a time of the succor game, and scene information such as scene information about how many points are there before a score scene. The user can download information about a cooperation image or an image file of the cooperation image by uploading an image file thus generated or cooperation participation information to a predetermined server.

FIGS. 25 and 26 are explanatory diagrams for describing an example of a method for determining a request condition. For example, the request condition may be determined for each event. In an example illustrated in FIG. 25, growth recording series, a stage, scheduled, an affair, an accident or a sport, and 3D shooting are respectively set as events, and setting examples of a time difference such as units of one day, units of one hour, units of several minutes, units of seconds, and a moment are respectively illustrated for a time difference between a cooperation source image and a cooperation image in shooting in the events. If shooting for growth recording of a child is performed, for example, the units of one day may be set as the request condition. In this case, a cooperation image shot within one day since shooting of a cooperation source image, for example, is required. In shooting of a sport, for example, setting in the unit of seconds is performed, and a cooperation image shot within several seconds since shooting of a cooperation source image, for example, is required.

FIG. 26 illustrates a schedule of sport progress, and indicates that a shoot scene has been shot from 9 minutes 30 seconds to 9 minutes 40 seconds of a first half and a goal scene has been shot from 13 minutes 30 seconds to 14 minutes 40 seconds of the first half. When a request condition includes information about such a schedule, a request of a picked-up image of a desired scene can also be simplified.

Thus, the request equipment can easily acquire an image which is desired to be supplied by describing request information in metadata of an image file.

If the control unit 21 in the camera 120 judges that the shooting mode has not been designated in step S41, the processing proceeds to step S60 illustrated in FIG. 21B. In step S60, the control unit 21 judges whether or not a reproduction mode has been designated. If the reproduction mode has been designated, then in subsequent step S61, the control unit 21 displays a list of images recorded in the recording unit 23. The control unit 21 then judges whether or not the user has selected a predetermined image in the list (step S62). If a selection operation by the user has not been performed, then in step S66, the control unit 21 judges whether or not an instruction to change the image has been issued. If the instruction to change the image has not been issued, the control unit 21 judges whether or not an end operation has been performed in step S67. If the control unit 21 judges that the end operation has been performed, the processing returns to step S41. If the control unit 21 judges that the end operation has not been performed, the processing returns to step S62.

If the control unit 21 judges that the selection operation has been performed in step S62, then in subsequent step S63, the control unit 21 enlarges and displays the selected image. In step S64, the control unit 21 further judges whether or not an operation for confirming a cooperation image has been performed. If the operation for confirming the cooperation image has been performed, then in step S65, the control unit 21 searches for and displays the cooperation image.

That is, the control unit 21 reads out metadata recorded in the recording unit 23 and refers to request information, to acquire a cooperation image. For example, the control unit 21 downloads a cooperation image based on information about request destination equipment and a request condition. The control unit 21 displays the downloaded cooperation image, updates, when it desires to acquire the cooperation image, the metadata, if necessary, based on information about the acquired cooperation image, and then the processing proceeds to step S66.

In this case, the pieces of equipment may also be able to cooperate with one another in a relatively long time period to spare rather than at a moment of shooting, and a cooperation condition becomes "cooperation reservation". Such practical use that another content can be referred to at the time of subsequent viewing may be made. That is, communication or the like need not be instantly performed. The communication of the information may be devised, when a communication environment is improved, for example.

If the control unit 21 performs NO judgment in steps S62 and S64, the processing also proceeds to step S66. If the control unit 21 judges that a request to change an image has been made in step S66, then in step S68, the control unit 21 changes the image, and the processing returns to step S64.

If the control unit 21 judges that the reproduction mode has not been designated in step S60, the processing proceeds to step S69. In step S69, the control unit 21 receives an image, sets communication, searches for and acquires a cooperation image, and acquires schedule information, for example, and the processing returns to step S41. Note that when the schedule information is used, a request condition for acquiring a cooperation image is easily designated by the user.

In step S74 illustrated in FIG. 22, the control unit 111 in the image management apparatus 110 judges whether or not an information request has been generated. If the information request has not been generated, the control unit 111 judges whether or not transmission has been finished (step S76). If the transmission has not been finished, the processing returns to step S73. If the transmission has been finished, the processing returns to step S70.

If the control unit 111 judges that the information request has been generated, the processing proceeds from step S74 to step S75. In step S75, the control unit 111 transmits an image and related information (event information), for example, to a request source. For example, when event information is transmitted, the camera 120 can reliably judge an event in step S46.

On the other hand, FIG. 19 illustrates how the camera 120 and one or more cooperation apparatuses 130 perform three-dimensional (3D) shooting of an object 151. Note that FIG. 19 illustrates only one of the one or more cooperation apparatuses 130 for simplification of the drawing. In an example illustrated in FIG. 19, the image management apparatus 110 is not adopted, and the camera 120 as request equipment directly transmits and receives cooperation participation information to and from the one or more cooperation apparatuses 130 as request destination equipment.

In the example illustrated in FIG. 19, an image of the object 151 is picked up by the camera 120 while being also picked up by the cooperation apparatus 130 in a direction of a different line of sight from a line of sight of the camera 120. The user performs a shooting operation while seeing a through image displayed on the display screen 121a of the display unit 121. The user operates the shutter button of the camera 120 with the right hand 125 to perform image pickup, to pick up an image Gb4 displayed on the display screen 121a. In the image Gb4, an image 151a of the object 151 is picked up.

On the other hand, the cooperation apparatus 130 as request destination equipment also picks up an image of the object 151. The cooperation apparatus 130 is of a stationary type attached to a tripod, for example, and is arranged at a predetermined position relative to the object 151, and can perform shooting at a request of the camera 120. When two or more pieces of image pickup equipment which differ in a line of sight, such as the camera 120 and the cooperation apparatuses 130, pick up an image of the object 151, a three-dimensional image can be obtained. That is, the cooperation apparatus 130 is controlled to shoot the object 151 at a time designated by information about a request condition in an image file recorded by the camera 120. Note that if 3D shooting is considered, information for performing shooting in the cooperation apparatus 130 within 0.1 seconds, for example, since the camera 120 performed shooting is described in a request condition. FIG. 20 illustrates a picked-up image Gc41 of the cooperation apparatus 130. The image Gc41 includes the image 151a of the object 151.

If the control unit 21 in the camera 120 judges that the event is 3D shooting in step S48 illustrated in FIG. 21A, the processing proceeds to step S49. In step S49, the control unit 21 performs shooting while judging a time, to generate cooperation participation information including the determined time, various types of shooting parameters, and the like. Respective shooting parameters in the camera 120 and the one or more cooperation apparatuses 130 are made common to make a quality of a picked-up image uniform so that a quality of a three-dimensional image can be improved.

At this time (at the time of the shooting), the parameters cannot cooperate with one another unless the pieces of equipment immediately cooperate with one another. Therefore, the pieces of equipment need to quickly cooperate with one another. The cooperation condition becomes a cooperation request or a cooperation condition also including immediacy.

In subsequent step S50, the control unit 21 compresses the picked-up image, generates metadata together with an operation history or the like, and files image data and the metadata. The control unit 21 further transmits an image file or cooperation participation information in the image file, if necessary. As a result, the cooperation apparatus 130 shoots the object 151 using the designated shooting parameter within a designated time period since the camera 120 performed shooting. If the control unit 21 acquires information about a cooperation image from the cooperation apparatus 130 as request destination equipment in step S50, the control unit 21 updates the metadata based on the acquired information.

FIG. 24 illustrates metadata of the camera 120 as request equipment. In an example illustrated in FIG. 24, trigger output equipment is the apparatus B representing the camera 120 as its own equipment, trigger judgment equipment is the apparatus B representing the own equipment, and shooting request equipment is also the apparatus B. In this case, information about the pieces of equipment may be omitted. In the example illustrated in FIG. 24, request destination equipment is an apparatus C1 representing the one cooperation apparatus 130, associated response equipment is the apparatus C1 representing the cooperation apparatus 130 which has shot the object 151, a request condition is ΔT4 indicating that an image has been shot within ΔT4 seconds since the camera 120 picked up the image Gb4, and a response image file name is an image Gc41 obtained by the cooperation apparatus 130 performing image pickup.

Note that in the example illustrated in FIG. 24, the plurality of cooperation apparatuses 130 are requested to perform shooting, and information for each of the pieces of equipment whose cooperation has been requested is described in the metadata. In the example illustrated in FIG. 24, as information about the cooperation apparatus 130 as the second request destination equipment, request destination equipment is an apparatus C2 representing the cooperation apparatus 130, associated response equipment is the apparatus C2 representing the cooperation apparatus 130 which has shot the object 151, a request condition is ΔT4 indicating that an image has been shot within ΔT4 seconds since the camera 120 picked up the image Gb4, and a response image file name is an image Gc42 obtained by the cooperation apparatus 130 performing image pickup.

That is, when the metadata illustrated in FIG. 24 is referred to, a relationship among a plurality of picked-up images obtained by the plurality of cooperation apparatuses 130 performing shooting can be grasped. Even if the camera 120 does not have a special control function for 3D shooting, a 3D image can be generated using the picked-up images obtained by the plurality of cooperation apparatuses 130 performing shooting.

Although 3D shooting has been described with an emphasis, it is needless to say that the 3D shooting is one example of cooperation among a plurality of pieces of equipment, has various application examples such as monitoring of a panoramic image, a wide field-of-view image, monitoring of a plurality of points, and acquisition of depth information, and also has a use for not making images cooperate with one another but making another information such as a voice cooperate with an image. That is, a relationship among contents constituting a cooperation content generated by the plurality of pieces of equipment cooperating with one another may be found. When a content creation system configured to give the relationship as metadata to each of the contents is used, the contents can be immediately associated with one another if separated from one another. The content creation system includes a metadata generation unit configured to generate as the above-described metadata information about the plurality of pieces of equipment as parties to the cooperation and request source information about a request source which has outputted a cooperation condition. Therefore, even when information acquisition is performed again, an original cooperation configuration can be immediately known, and can be simply reproduced and improved.

Note that an example in which the one camera 120 and the one or more cooperation apparatuses 130 perform 3D shooting has been described in FIG. 19, a plurality of cameras 120 may perform 3D shooting. In this case, the one camera 120 becomes parent equipment and the other cameras 120 respectively become pieces of child equipment, to perform shooting. The camera 120 as the parent equipment may generate cooperation participation information including request information, the camera 120 as the child equipment may generate cooperation participation information including supply information.

Thus, in the present embodiment, a similar effect to an effect in the first embodiment can be obtained, and a useful image can be easily acquired in various events.

Thus, the present application comprehensively examines advanced purposes of leaving judgment which pieces of equipment have been connected to one another, which of the pieces of equipment has performed shooting and based on which information the shooting has been performed in an image file (evidence), leaving judgment which image is desired and under which situation the image has been desired in an image file (and putting the judgment on a web), and leaving judgment which image is desired and to where the desired image has been submitted (is scheduled to be submitted) in an image file (and putting the judgment on the web), for example, to devise metadata which is unprecedented, is not useless, and is easily generated. That is, the present application clarifies pieces of equipment as parties which attain the above-described advanced purposes in complicated cooperation. An image of a target is acquired, and image pickup request information acquired at the time of the acquisition of the image, a transmission apparatus configured to transmit the image pickup request information, and a ground for a request from the transmission apparatus are recorded in association with data of the acquired image. An image of a target is acquired, and a condition under which an image pickup request is made in association with the image is set as request information, and is recorded in association with the acquired image data. Further, a situation where the image of the target is acquired, and target equipment information for requesting to perform image pickup in association with the image is set as request information to cooperatively acquire information to be recorded in association with the acquired image data is clarified. Accuracy of information thus obtained increases, and evidentiality is also improved.

Note that, although description has been made using the wearable terminal apparatus, the normal camera, and the broadcasting camera, for example, as equipment for shooting in the embodiments of the present invention, any image pickup device may be adopted if it can acquire a picked-up image. Examples of equipment for shooting may include a lens type camera, a digital single-lens reflex camera, a compact digital camera, cameras for movie such as a video camera and movie camera, and further cameras contained in PDAs (personal digital assistants) such as a mobile phone and a smartphone if not bound by an installation location. Examples of the equipment for shooting may include industrial and medical optical instruments such as an endoscope and a microscope, and a monitoring camera, an in-vehicle camera, a stationary type camera, and cameras attached to a television receiver and a personal computer, for example.

Furthermore, in the embodiments, a portion described as a section or a unit may be configured by combining a dedicated circuit and a plurality of general-purpose circuits, or may be configured by combining processors such as a microprocessor and a CPU configured to operate according to software previously programmed or sequencers, if necessary. The portion can also be designed such that an external apparatus assumes a part or the whole of control of the portion. In this case, a wired or wireless communication circuit is interposed. A communication unit may not be specially written for simplification. However, an embodiment in which external equipment such as a server or a personal computer performs processing characteristic or complementary to the present application is also assumed. That is, the present application also covers a case where a plurality of pieces of equipment establish a characteristic of the present invention in cooperation. For communication at this time, Bluetooth (registered trademark), Wi-Fi (registered trademark), a telephone line, or the like is used. Communication at this time may be performed by a USB or the like. A dedicated circuit, a general-purpose circuit, and a control unit may be integrally configured as an ASIC. Such an apparatus or a system may have a function of making any approach to a user or changing an angle of a component, for example, a mechanism of the apparatus or the system includes various actuators and a connection mechanism, if necessary, and the actuators operate by a driver circuit. The driver circuit is also controlled by a microprocessor, a microcomputer, an ASIC, or the like according to a specific program. For the control, detailed correction and adjustment, for example, may be performed according to information outputted by various types of sensors and peripheral circuits of the sensors.

The present invention is not limited as it is to each of the above-described embodiments. In an implementation stage, components can be deformed and embodied without departing from the scope and spirit of the invention. Various inventions can be formed by appropriate combinations of a plurality of components disclosed in each of the above-described embodiments. For example, some of all the components described in the embodiment may be deleted. Further, the components over the different embodiments may be combined, as needed.

Note that, even if an operation flow is described using "first", "then", or the like for convenience in the claims, the specification, and the drawings, it is not intended that the operation flow must be implemented in this order. It is needless to say that steps constituting the operation flow can be omitted, as needed, for portions which do not affect the essence of the invention.

Many of controls and functions mainly described in flowcharts among techniques described here are settable by a program, and the above-described controls and functions can be implemented when a computer reads and executes the program. The whole or a part of the program can be recorded or stored in a portable medium such as a flexible disc, a CD-ROM, or a nonvolatile memory, or a storage medium such as a hard disk or a volatile memory as a computer program product, and can be circulated or provided at the time of product shipping or via the portable medium or a communication line. When a user downloads the program via a communication network and installs the program into the computer or installs the program into the computer from the recording medium, the image processing apparatus according to the present embodiment can be easily implemented.

What is claimed is:

1. An image file creation apparatus comprising:
   an acquisition circuit configured to acquire a picked-up image; and
   a processor configured to create an image file in recording the acquired image,
   wherein the processor includes cooperation participation information for clarifying a relationship between the picked-up image and a cooperation image cooperating with the picked-up image as metadata in the image file,
   wherein the processor receives information for specifying the cooperation image from equipment at a request destination of the provision of the cooperation image, and then acquires the cooperation image based on the received information, and
   wherein the cooperation participation information includes at least one of
   (a) request information for requesting to provide the cooperation image cooperating with the picked-up image, and/or
   (b) provision information indicating whether or not the picked-up image can be provided as the cooperation image.

2. The image file creation apparatus according to claim 1, wherein the picked-up image and the cooperation image are associated with each other by each having at least one of the provision information and the request information as the metadata.

3. The image file creation apparatus according to claim 1, wherein
the request information includes information about a request condition representing the relationship between the picked-up image and the cooperation image.

4. The image file creation apparatus according to claim 3, further comprising
an image pickup device configured to pick up the picked-up image,
wherein the processor includes, as information about the request condition, information representing a relationship between an image pickup time of the picked-up image and an image pickup time of the cooperation image.

5. The image file creation apparatus according to claim 3, wherein
the processor includes, as information about the request condition, at least one of information about equipment at a request destination of provision of the cooperation image, information about equipment at a supply source of the cooperation image, and information for specifying the cooperation image.

6. The image file creation apparatus according to claim 1, wherein
the processor includes, as the provision information, information about equipment configured to generate a trigger for picking up the cooperation image.

7. The image file creation apparatus according to claim 6, wherein
the processor includes, as the provision information, at least one of information about equipment configured to judge a timing of the trigger for picking up the cooperation image and information about equipment configured to directly request to provide the cooperation image.

8. The image file creation apparatus according to claim 1, wherein
the processor creates the cooperation participation information after acquiring the picked-up image by the acquisition circuit while receiving information for specifying the cooperation image from equipment at a request destination of the provision of the cooperation image, and then updates the cooperation participation information.

9. An image file creation method comprising:
acquiring a picked-up image;
adding cooperation participation information including at least one of (a) provision information for providing the picked-up image, and/or (b) request information for requesting to provide a cooperation image having a predetermined relationship with the picked-up image, as metadata to the picked-up image;
including information about a request condition representing the predetermined relationship between the picked-up image and the cooperation image as the request information in the metadata;
receiving information for specifying the cooperation image from equipment at a request destination of the provision of the cooperation image; and
then acquiring the cooperation image based on the received information.

10. A non-transitory computer readable recording medium storing an image file creation program for causing a computer to:
acquire a picked-up image;
add cooperation participation information including at least one of (a) provision information for providing the picked-up image, and/or (b) request information for requesting to provide a cooperation image having a predetermined relationship with the picked-up image, as metadata to the picked-up image;
include information about a request condition representing the predetermined relationship between the picked-up image and the cooperation image as the request information in the metadata;
receive information for specifying the cooperation image from equipment at a request destination of the provision of the cooperation image; and
then acquire the cooperation image based on the received information.

11. A content creation system comprising:
a content creation circuit provided in each of a plurality of pieces of equipment to create a cooperation content created by the plurality of pieces of equipment in cooperation; and
a processor provided in each of the plurality of pieces of equipment,
wherein the processor provided in each of the plurality of pieces of equipment
adds a relationship among contents constituting the cooperation content as metadata to each of the contents,
generates, as the metadata, information about the plurality of pieces of equipment as parties to the cooperation and request source information about a request source which outputs a cooperation condition,
receives information for specifying the cooperation image from equipment at a request destination of the provision of the cooperation image, and
then acquires the cooperation image based on the received information.

* * * * *